(12) United States Patent
Fukushima et al.

(10) Patent No.: US 6,621,513 B2
(45) Date of Patent: Sep. 16, 2003

(54) PRINTER

(75) Inventors: Itaru Fukushima, Tokyo (JP); Satoshi Yamanushi, Nirasaki (JP); Yuuki Horigome, Kofu (JP)

(73) Assignee: Nisca Corporation, Yamanashi-ken (JP)

( * ) Notice: Subject to any disclaimer, the term of this patent is extended or adjusted under 35 U.S.C. 154(b) by 26 days.

(21) Appl. No.: 09/969,794

(22) Filed: Oct. 4, 2001

(65) Prior Publication Data

US 2002/0039133 A1 Apr. 4, 2002

(30) Foreign Application Priority Data

| Oct. 4, 2000 | (JP) | 2000-304677 |
| Oct. 4, 2000 | (JP) | 2000-304679 |
| Oct. 4, 2000 | (JP) | 2000-304683 |
| Oct. 4, 2000 | (JP) | 2000-304687 |
| Oct. 4, 2000 | (JP) | 2000-304691 |

(51) Int. Cl.$^7$ .................................................. B41J 2/435
(52) U.S. Cl. ............................................ 347/263; 347/246
(58) Field of Search ................................. 347/234, 240, 347/245, 228, 262, 263, 264; 271/3.06; 355/401; 250/589

(56) References Cited

U.S. PATENT DOCUMENTS 4,889,989 A * 12/1989 Yoshimura et al. .......... 250/589
4,968,014 A * 11/1990 Yamakoshi et al. ......... 271/3.06
5,126,781 A * 6/1992 Tomizawa et al. .......... 355/401

FOREIGN PATENT DOCUMENTS

| JP | 06-321368 | 11/1994 |
| JP | 8-225221 | 9/1996 |
| JP | 9-34041 | 2/1997 |
| JP | 2665393 | 6/1997 |
| JP | 10-119346 | 5/1998 |
| JP | 2000-162715 | 6/2000 |

* cited by examiner

*Primary Examiner*—Hai Pham
(74) *Attorney, Agent, or Firm*—Kanesaka & Takeuchi

(57) ABSTRACT

A printer for printing on a recording medium with a plurality of processes includes a first processing section for making a first process on the recording media; a second processing section arranged close to the first processing section for making a second process different from the first process on the recording media on which the first process was made, thereby obtaining an image on a surface of the recording medium; and a recording medium feed path formed between the first processing section and the second processing section. The entire apparatus is made compact without decreasing a recording medium feeding performance and a printing process capability by that a plurality of processing units serving for the printing processes and recording medium feed path linking those units are arranged reasonably.

17 Claims, 26 Drawing Sheets

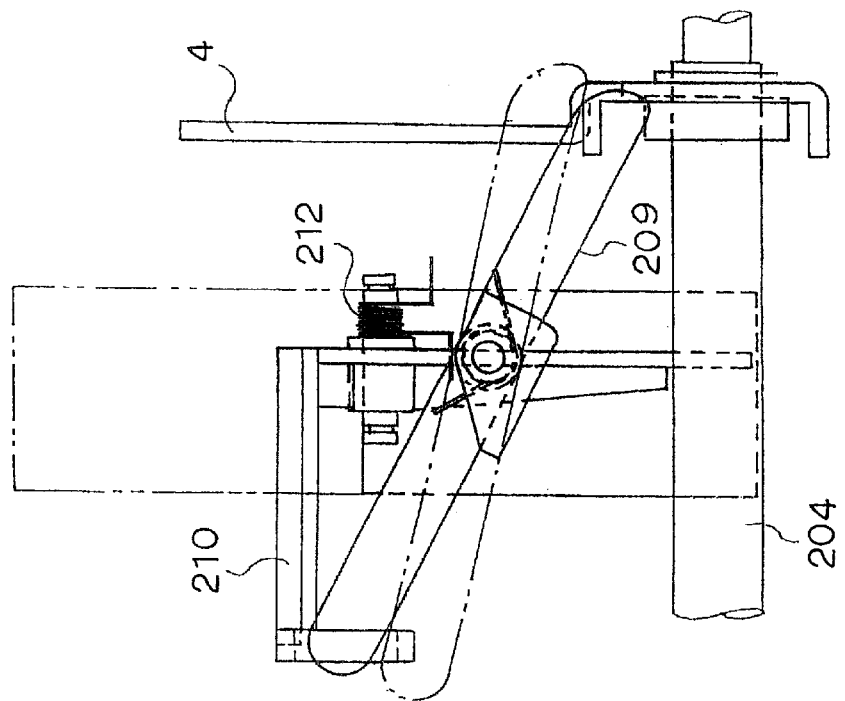
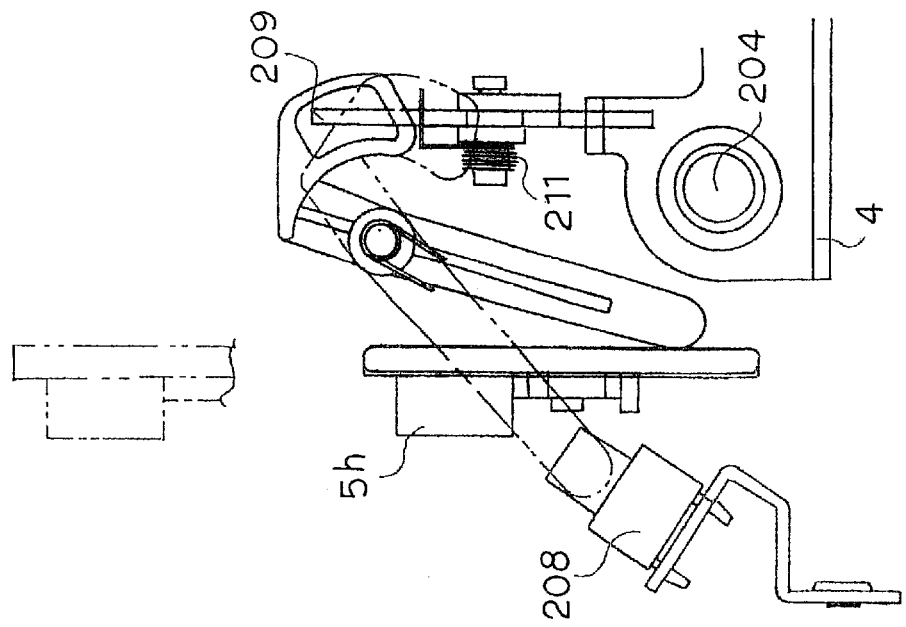
FIG. 12A
FIG. 12B

PRINTER

BACKGROUND OF THE INVENTION

1. Field of the Invention

The present invention relates to a printer for printing images and the like on recording media such as photosensitive recording sheets, particularly to a printer the entire size of which is made compact without decreasing recording medium feeding and printing capabilities.

2. Description of the Prior Art

Prior printers make exposure on a photosensitive recording sheet before pressing it to develop, thereby forming an image on a surface of the photosensitive recording sheet. As an example, Japanese Patent Application Publication 2000-162715(A) discloses a recording apparatus as printer that: a photosensitive recording sheet called the Cycolor medium is used that is formed of lamination of microcapsules filled with either one of coloring materials of cyan, magenta, and yellow each; the photosensitive recording sheet has a light of desired wavelength irradiated to a surface thereof to expose a color image; in other words, the surface is made to react to a light of specific wavelength to cure a sensitive material filled in the microcapsule together with the coloring material; the curing makes coloring reaction of the coloring material inactive; after that, a high pressure is applied to the active microcapsule without reacting to the light of specific wavelength to destroy for development (coloring), thereby forming the color image.

The prior printer mentioned above has an advantage that a running cost for printing can be kept low as consumable materials such as toner and ink or ink ribbon are not needed except for the above-mentioned Cycolor media only for forming, or printing, the color image. However, it has a problem pointed out that it takes a long time to print on a single photosensitive recording sheet (cycolor media) as the pressing and developing processes have to be made after some stabilization time called the dark time required after the exposing process.

To shorten the processing time, the above-mentioned prior printer is modified to make the sheet feeding and exposing processes in such a parallel way that a plurality of retaining tables for holding the photosensitive recording sheet is formed of a polyhedron, for example, a tetrahedron, the retaining tables form a cyclic arrangement having a first position for feeding the recording sheet, a second position for exposing the image to the fed recording sheet, and a third and fourth positions for allowing for the dark time. The way can shorten the process time for the plurality of photosensitive recording sheet while allowing for the dark time.

However, even the above-described prior art has problems such that the apparatus is made large as wide space is needed in the apparatus for containing the plurality of retaining tables formed of polyhedron, and also an additional driving arrangement for operating the cyclic arrangement is needed, and further a complicated control system is needed for the cyclic operation of the plurality of retaining table. As a result, it would be involved in high apparatus manufacturing cost, or cost increase.

The above-described prior art arranges in virtually linear order the cartridge as a sheet feeding section for containing a plurality of medium (photosensitive recording sheets), the exposing stage for making exposure on the media, the unit for pressure-developing the exposed medium, and the sheet discharging tray. It also has the exposing unit of projector type for irradiating light to the exposing stage arranged in parallel with the linear path. It results in large size of the whole apparatus, particularly in wide installation area for the apparatus.

The above-described prior art includes disclosures that the exposing unit of projector type is arranged perpendicular to the linear path, but the plurality of above-mentioned units are arranged still virtually in line. As a result, the entire apparatus occupies a large installation area.

Further, the above-mentioned Cycolor media is on the marked in forms as blank cut sheets, such as a rectangular form, before the printing processes (exposing and pressure-developing processes). In the cutting process to the blank forms, the Cycolor medium has an undesired force applied to four edges thereof. The four edges result in destruction of the microcapsules of unactiviated (active) state having the coloring materials filled therein, the microcapsules being thereon. It is disadvantageous that the four edges cannot be developed to desired colors, but becomes black or undesirable results. To dissolve such problems, it is desirable to an additional cutting arrangement for cutting out the edges of the developed medium. Addition of the cutting arrangement to the prior printer, however, makes the linear path formed in the apparatus further longer. As a result, it is unavoidable that the entire apparatus is made further larger, occupying wider apparatus installation area and volume.

Another Japanese Patent No. 2665393(B) discloses that an image-receiving sheet as a recording medium is to be fed on the feed path arranged in approximately horseshoe cross-section along inside walls of the apparatus housing. The units served for forming (printing) the image, however, are arranged on upper and lower portions, and the medium feed paths for achieving image forming are linked between the upper and lower portions. The resulting volume occupied by the entire apparatus becomes large. Further, the cassette as a medium feeding section is arranged on the bottom of the apparatus, and the sheet discharging section is on the top of the apparatus. The apparatus therefore is lowered in the operationability and maintainability.

OBJECT OF THE INVENTION

An object of the present invention is to provide a printer that an entire apparatus is made compact without decreasing a recording medium feeding performance and a printing process capability in a way that a plurality of processing units serving for the printing processes and recording medium feed path linking those units are arranged reasonably.

Another object of the present invention is to provide a printer that minimizing the entire apparatus and maximizing the recording medium feed path are achieved at the same time.

Still, another object of the present invention is to provide printer that no large-scale arrangements are provided for printing processes to meet a required printing accuracy and to shorten a processing time.

Still another object of the present invention is to provide a printer of low price by way of suppressing apparatus manufacturing costs with use of simple feed driving arrangements and controls.

Still another object of the present invention is to provide a printer increased in operationability and maintainability.

SUMMARY OF THE INVENTION

Briefly, the foregoing objects are accomplished in accordance with aspects of the present invention by a printer having an apparatus housing and making a plurality of processes on a recording medium, comprising in combination: a first processing section for making a first process on said recording medium; a second processing section arranged close to said first processing section for making a second process on said recording medium having had the first process made by said first processing section, thereby capable of obtaining an image on a surface of the recording medium, the second process being different from the first process by said first processing section; and, a recording medium feed path formed between said first processing section and said second processing section; wherein said recording medium feed path is arranged to form virtual traversing. The recording medium feed path has a staying section having said recording medium made to stay therein. The recording medium feed path has a switchback path for substantially extending said recording medium feed path provided on a part of said recording medium feed path.

The first processing section is made up of an exposing section for making exposure on said recording medium and, said second processing section is made up of a developing section for making development by pressing said recording medium having the exposure made thereon by said exposing section. The exposing section has an exposing light source, an exposing stage arranged at an exposure position at which the exposure is made on said recording medium, and an exposing system arranged in an exposure path from said exposing light source to said exposing stage, said exposing light source being provided at an upper portion of said apparatus housing and said exposing stage being provided at a lower portion of said apparatus housing and on said recording medium feed path. The developing section is preferably arranged at a lower portion of said apparatus housing.

The printer further comprises in combination a containing section arranged close to said exposing section for containing said recording medium before printing is made and a take-out section for taking out the printed recording medium, wherein said containing section and said take-out section are arranged on one side of said apparatus housing and said developing section is arranged on the other side of said apparatus housing. The exposing section is arranged around a center of said apparatus housing; and further, the feed path for said recording medium extending from said containing section to said exposing section is formed to curve and the feed path for said recording medium extending from said developing section to said take-out section is formed to curve on a diagonal line,of said apparatus housing. The recording medium feed path extending from said containing section to said take-out section is formed along inside surfaces of said apparatus housing so as to enclose said exposing section.

The developing section has paired rollers for pressing said recording medium at a specific pressure and wherein said recording medium feed path is formed so that said recording medium having had pressure development process made along parts of a surface of one of said paired rollers is fed to a downstream side.

The exposing stage has stretching means for making said recording medium stretch plain. The stretching means has paired feed rollers made to rotate while pressing against both sides of said recording medium to applying a specific feeding force to said recording medium and wherein at least one of said paired feed rollers is made to act on said recording medium while said feeding force opens at a specific angle with respect to the feed direction of said recording medium.

The printer further comprises in combination a fixing section for fixing the image formed on a surface of said recording medium having the image developed thereon by said developing section, wherein said fixing section is provided above said exposing section. The fixing section is structured to re-irradiate a light from said exposing light source to the surface of said recording medium having the image formed thereon to fix the image thereon.

The containing section has a cassette therein having a package having said recording medium contained therein and a light shielding member for shielding said recording medium contained in said package against external lights. The package has a humidity conditioning agent provided therein, said humidity conditioning agent being replaceable or refillable. The cassette has identifying means for identifying said recording medium contained in said package provided therein.

The containing section further has a lid allowing said cassette to load from an outside and a shutter switching arrangement for opening and closing a shutter provided on said cassette, said shutter switching arrangement being made up of a link member for liking between said lid and said cassette so as to open said shutter after closing of said lid.

The take-out section is arranged at a top portion of said apparatus housing and has a post-heating section provided therein for post-heat-processing said recording medium having had printing made thereon. The post-heating section has heaters for heating said recording medium and staying means for making a plurality of said recording media stay therein. The staying means is structured for making said recording media stay in succession while moving said recording media in vertical direction. The staying means has at least four screws for supporting said recording media horizontal, each of said screws having a recording medium placing portion continuing vertically for successively moving said recording media placed on said recording medium placing portion vertically with said screws driven to rotate. Below said staying means is arranged feeding means for feeding outward said recording medium dropping from said recording medium placing portion.

The foregoing and other objects, advantages, manner of operation and novel features of the present invention will be understood from the following detailed description when read in connection with the accompanying drawings.

BRIEF DESCRIPTION OF THE DRAWINGS

FIG. 3A is a perspective exploded view for structure of a media package.

FIG. 3B is a perspective view for the package having media loaded in.

FIG. 4A is a perspective exploded view for structure of a medium cassette having the cassette loaded in.

FIG. 4B is a perspective view for the medium cassette having the package loaded in.

FIG. 9 is a side view for the cassette room having the medium cassette loaded in.

FIG. 12A is a front view for a detecting device for detecting a position of the back plate.

FIG. 12B is a side view for the detecting device shown in FIG. 12A.

DESCRIPTION OF PREFERRED EMBODIMENTS

The following describes in detail an embodiment of the printer according to the present invention in reference to the drawings attached here.

The printer according to the present invention includes an ink jet printer, a laser printer, and similar printing apparatuses. This embodiment described is for a printer appropriate for Cycolor film (hereinafter referred to as the Cycolor printer), and the Cycolor film is a photosensitive recording sheet.

First, an overview of the Cycolor printer embodied according to the present invention is described below.

Figure 1:
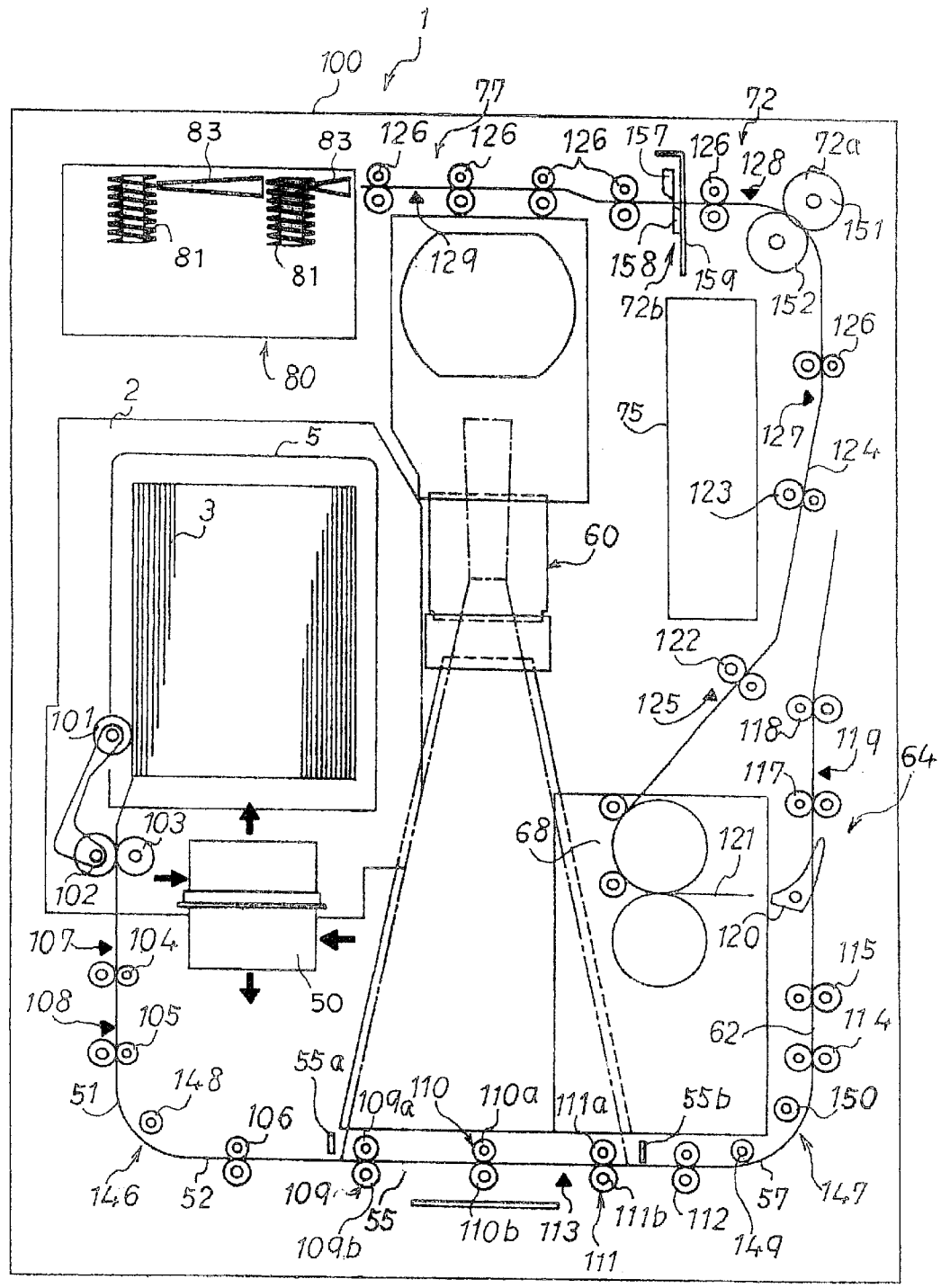
FIG. 1 is a front overview for an entire structure of the printer in an embodiment of the present invention.

FIG. 1 is a front view illustrating the Cycolor printer 1. A top and a bottom of the figure correspond to those of an apparatus housing 100, and a right and left sides are to those of the apparatus housing 100.

A medium container for medium 3, including recording medium and film, is arranged virtually at a center on a side of the apparatus housing 100. A medium unloading port for the medium 3 is arranged closed to the medium container, on the top of the apparatus housing 100. A feed path is formed from the medium container to the medium unloading port. Along the feed path are disposed processing sections, including an exposing section, a developing section, and a fixing section. The feed path is disposed in a loop manner inside the apparatus housing 100 as wrapping the processing sections. Parts of the feed path are sharply curved, including a switchback section 64 and an alternative path 121 that will be described later. Such a construction allows every processing section to have space enough to make a single medium stay therein.

The medium container has a cassette room 2 disposed on a side of the apparatus housing 100, on an upper left side of around the center in the figure. The cassette room 2 can receive a medium cassette 5 therein from a front side in the figure. The medium cassette 5 is capable of containing a many number of media 3 (around 500 sheets in the embodiment) for forming desired images. For loading the many number of media 3, they are put downward into the medium cassette 5, vertically in the apparatus housing 100 (printer 1). In other words, the many number of media 3 can be loaded so that they can be linearly fed out of the medium cassette 5 to the feed path without changing their direction.

Loading the medium cassette 5 in the medium container, or the cassette room 2, makes synchronization with a medium picking arrangement (a medium feed unit which will be described later) to run a pick roller 101. The pick roller 101 is pressed to the medium 3 in the medium cassette 5. At the same time, a medium pressing arrangement (which will be described later) is run to press the medium 3 in the medium cassette 5 to the pick roller 101. As a result, the pick roller 101 can be kept to feed out the medium 3 in the medium cassette 5 one by one in sequence. The cassette room 2 also has a medium separating arrangement disposed therein for preventing more than one sheet of the medium 3 fed by the pick roller 101 from being fed out to a feed path 51 (which will be described later) at the same time. The medium separating arrangement is formed of a pick roller 101 and a separating roller 103 faced and pressed to each other. The feed roller 102 is controlled in rotation so as to feed out the medium 3 toward the feed path 51, while the separating roller 103 is controlled in rotation so as to draw back the medium 3 toward the pick roller 101. The feed roller 102 in the embodiment is controlled to have greater drive force (torque) than the separating roller 103. Such a medium separating mechanism can separate the medium 3 fed by the pick roller 101 one by one before feeding to the feed path 51.

The medium 3 is formed of a viscous layer having polyester film coated with a bonding layer and containing numbers of photosensitive microcapsules called Cyliths and a transparent PET (polyethylene terephthalate) layer covering it.

Each of the microcapsules is filled with a photosensitive agent reactive to a different wavelength and either one of dyes of CYM (cyan, yellow, and magenta). The microcapsule containing the cyan dye is cured with a red light received, that of the yellow dye with a blue light, and that of the magenta with a green light. Microcapsules being not reactive to lights of specific wavelengths and ones receiving no lights cannot be cured. Such microcapsules and a developing and fixing agent called the developer resin are bound to a special oily viscous agent to form the viscous layer.

Thus, when exposure is made by an exposing projector (which will be described later), red exposure portions have only the cyan dye cured, leaving the other dyes not cured. When a high pressure is applied by a developing roller arranged on the downstream end, the microcapsules containing the yellow dye and the magenta dye are disrupted, resulting in appearance of the red color. Similarly, green exposure portions have only the magenta dye cured, and the microcapsules containing the cyan dye and the yellow dye are destroyed, resulting in appearance of the green color. Blue exposure portions have only the yellow dye cured, and the microcapsules containing the cyan dye and the magenta dye are disrupted, resulting in appearance of the blue color.

The microcapsule is of a few microns of size. An LCD (liquid display panel) used for printing contains a few capsules per pixel. A curing degree of a microcapsule differs with amount of exposure. These mean that an image of numbers of color gradations can be formed with each microcapsule cured and disrupted depending on color data of each pixel.

It is preferable to control an inside of the medium cassette 5 with respect to temperature, humidity, and other environmental factors. For the purpose, the cassette room 2 having the medium cassette 5 received therein has temperature controlling means arranged on a bottom thereof. In detail, the temperature controlling means is a temperature controlling device 50 (Peltier device) utilizing the Peltier effect that can produce temperature difference depending on a direction of a current flowing at a junction of dissimilar metals thereof. The Peltier device 50 is sandwiched in between DC fans to enhance the temperature control effect. Air, as indicated by arrows, is sucked in directions traversing rotation shafts of the DC fans and exhausted in directions of the rotation shafts to efficiently control the temperature in the medium cassette. It should be noticed that the Peltier device 50 can select either side as a low temperature side according to a polarity of a voltage applied to the junction. A temperature sensor (not shown) installed in the cassette room 2 controls the temperature to a target temperature of around 35 degrees C. Construction for controlling the temperature will be described in detail later.

Below the feed path 51 is arranged the feed path 51 for feeding the medium 3 fed out of the medium cassette 5. The feed path 51 is directed down from the medium cassette 5 toward a bottom of the apparatus housing 100 before being extended along the bottom of the apparatus housing 100 to an exposure path disposed along the bottom.

The feed path 51 has a plurality of feed rollers (two pairs of feed rollers 104 and 105 in this embodiment) arranged therealong.

The error detecting sensor 107 is controlled to detects a state of the medium 3 and signals a feed error when a plurality of media 3 is not separated by the medium separating arrangement mentioned above before being fed out at the same time. In the operation, feeding of the medium 3 is stopped in synchronous with the feed error indication.

The medium detecting sensor 108 is controlled to detect a leading edge of the medium 3 fed out of the feed path 51 via the paired feed rollers 104 before feeding out a leading edge detection signal. In the operation, a medium feeding arrangement (which will be described later) stops the pick roller 101 and the medium separating arrangement, including the feed roller 102 and the separating roller 103, from rotating and allows only the paired feed rollers 104 and 105 according to the leading edge detection signal. This can feed only single sheet of the medium 3 to the feed path 51. The sheet of medium 3 then is transferred to the exposure path. With the transference to the exposure path, the following sheet of medium 3 is fed to the medium cassette 5 at a predetermined instance before being stopped at a stand-by position (not shown) set in front of the exposure path. This assures the medium 3 can be transferred to the exposure path one by one.

The exposure path is formed of a pre-stage path 52 disposed in series to the feed path 51 for feeding downstream the medium 3 having passed through the feed path 51, an exposing stage 55 disposed downstream in series to the pre-stage path 52, and a post-stage path 57 disposed downstream in series to the exposing stage 55 for feeding the medium 3 having passed through the exposing stage 55.

The exposure path has a plurality of paired rollers therein for feeding downstream the medium 3 fed via the feed path 51. In the embodiment are disposed one pair of feed rollers 106 in the pre-stage path 52, three pairs of feed rollers 109, 110, and 111 in the exposing stage 55 at an equal interval, and one pair of feed rollers 112 in the post-stage path 57.

The exposing stage 55 has a medium detecting sensor 113 disposed between the two pairs of feed rollers (between the paired rollers 110 and 111 in the embodiment). According to a sensor signal of the medium detecting sensor 113, the medium 3 can be halted once at an exposure position on the exposing stage 55. In detail, the medium detecting sensor 113 sends the sensor signal out if the medium 3 is put at the exposure position on the exposing stage 55 with the medium 3 fed on the exposing stage 55 via the pre-stage path 52. At that time, the paired rollers 109, 110, and 111 are controlled to stop rotating in synchronous with the sensor signal.

In the state that the medium 3 is halted once, the medium 3 is exposed separately to three primary color lights, including R (red), G (green), and B (blue), on a printing side 3a thereof (FIG. 2) for a preprocess to form a desired image. It should be noticed that Mylar light shields 55a and 55b are arranged on the upstream end and the downstream end of the exposing stage 55 respectively. The light shields 55a and 55b prevent the printing side 3a of the medium 3 from being irradiated by external noise light (disturbing light) while exposure is made on the exposing stage 55. In addition, a heater (not shown) is disposed on the bottom of the exposing stage 55 to keep the temperature of the exposing stage 55 to a specific value. The heater can minimize heat radiation of the exposing stage 55.

An exposing projector 60 as exposure light source is disposed at a position, above around a center of the apparatus housing 100, facing the exposing stage 55. The exposing projector 60 irradiates light to the printing surface 3a of the medium 3 for a specific exposure process.

The exposing projector 60 and the exposing stage 55 in the embodiment are integrated together as an exposing section, or preprocessing means (first processing section) for preprocessing to form the image on the printing surface 3a of the medium 3.

Figure 2:
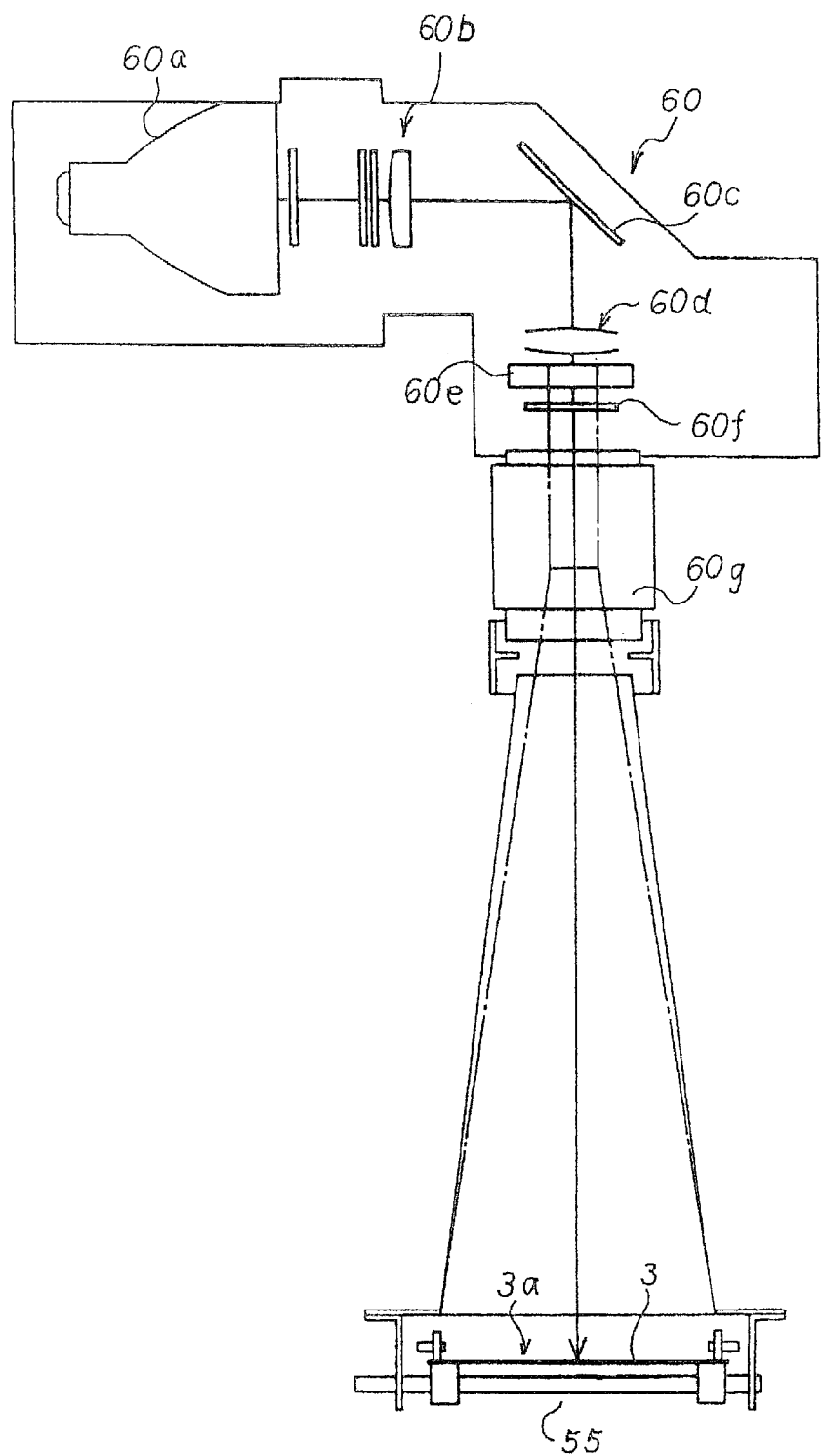
FIG. 2 is an overview for structure of an exposing projector.

In the exposing projector 60, as shown in FIG. 2, the light radiated from the light source 60a (metal halide lamp) is aligned to a parallel beam through a second optical system 60b (an optical system including a fly array lens and a polarization converter device). The parallel beam then is deflected downward, or toward the exposing stage 55, by a mirror 60c before passing a second optical system 60d having a field lens, a three-color RGB filter driven to rotate, and a wave plate. If the three-color RGB filter is rotated, color image patterns are formed through an LCD panel 60e in timing with respective R, G, and B light. The image formed on the LCD panel 60e then is projected onto the printing surface 3a of the medium 3 on the exposing stage 55 via a deflecting plate 60f and a projecting lens 60g.

The medium 3 having such an exposure process made is transferred to the post-stage path 57 via the paired feed rollers 112 before being controlled to stay on the post-stage path 57 for a specific sensitizing time. The sensitizing time is a period of time needed to develop colors on the exposed medium 3 through a developing process (which will be described later) and optimized depending on a kind of the medium 3, an exposing time, and other actors. After the sensitizing time elapsed, the medium having stayed on the post-stage path 57 is transferred to a feed path 62 via paired feed rollers 114. It should be noticed that the post-stage path 57 is flexed upward (from the bottom to the top of the apparatus housing 100) and is connected with the feed path 62. The feed path 62 is extended upward inside the apparatus housing 100.

The feed path 62 formed vertically with respect to the apparatus housing 100 has paired cleaning rollers 115 and switchback section 64 disposed therearound in the order. The exposed medium 3 is cleaned by the paired cleaning rollers 115 before being fed to the switchback section 64. In synchronous with feeding of the medium 3, a successive medium 3 is fed and positioned on the exposing stage 55. It should be noticed that the paired cleaning rollers 115 is made a unit for periodic elimination of dust. The unit is removable from the feed path.

The exposed medium 3 is stayed in the switchback section 64 for a dark time needed for coloring by the developing process (which will be described later). In detail, the switchback section 64 has two pairs of feed rollers 117 and 118 arranged therein along the feed path 62. The feed path 62 between the paired feed rollers 117 and 118 has a medium detecting sensor 119 disposed thereon. If the exposed medium 3 being fed by the paired feed rollers 117 and 118 reaches a specific position, the medium detecting sensor 119 outputs an sensor signal. The paired rollers 117 and 118 are synchronized with the sensor signal to stop. The exposed medium 3 is stayed at the specific position in the switchback section 64 for the sensitizing time. For the sensitizing time, the exposed medium 3 being successively fed is made to stay on the feed paths 57 and 62 between the exposing stage 55 and the switchback section 64.

The feed path 62 in the switchback section 64 is extended upward inside the apparatus housing 100 before being broken at around a vertical center of the apparatus housing 100. The medium 3 made to stay at the specific position in the switchback section 64 is returned on the same feed path 62 and guided through an alternative path 121 branched from an inlet of the switchback section 64 to paired pressure developing rollers 68 that are a developing unit (which will be described later).

The following describes operation of the switchback section 64.

The medium 3 exposed on the exposing stage 55 continues photosensitization (exposure reaction) in the microcapsules thereof for a while even after the light irradiation stops. For the reason, the stabilizing time (dark time) for stabilizing the photosensitive reaction in the microcapsules is needed before the microcapsules are fractured by pressure of the paired pressure developing rollers 68. The stabilizing time can be obtained by making longer the feed path from the exposing stage 55 to the paired pressure developing rollers 68. However, the arrangement must be made large due to the long feed path accordingly.

The switchback section 64 therefore is provided to make the medium switchback to obtain the dark time needed without making the apparatus large. The paired feed rollers 117 and 118 disposed in the switchback section 64 are arranged so that they can be controlled to drive independently of the paired feed rollers 112 and the paired pressure developing rollers 68 on the post-stage path 57. The dark time for reaching the paired pressure developing rollers 68 can be changed, made longer or shorter, freely by adjusting the staying time of the medium 3 in the switchback section 64.

After the dark time elapses, the paired feed rollers 117 and 118 are controlled to rotate in reverse direction if the paired pressure developing rollers 68 are synchronized with the paired feed rollers 117 and 118 in the switchback section 64, that is, if no preceding medium 3 exists between the paired pressure developing rollers 68 for development. As a result, the medium 3 is fed in the reverse direction.

In the embodiment, a switching gate 120 is disposed on the feed path 62 between the paired feed rollers 117 and the paired cleaning rollers 115. The switching gate 120 is actuated in synchronous with the reverse rotations of the paired feed rollers 117 and 118. For the reason, the medium 3 fed in the reverse direction on the feed path 62 is fed to the alternative path 121 via the switching gate 120 before being guided to the paired pressure developing rollers 68 with the printing surface 3a kept to direct up.

The paired pressure developing rollers 68, as shown in FIG. 1, are arranged to rotate as the rollers press each other at a specific pressure. The exposed medium 3 in which the microcapsules have been cured has a load applied to both surfaces thereof when passing the rollers 68 to destruct the microcapsules of hardness depending on amount of exposure. With the microcapsules of the specific hardness destructed, die (ink) in the microcapsules exudes out to develop, or color, the image.

On the downstream of the paired pressure developing rollers 68 is extended the path 121 to the top of the apparatus housing 100 along inside the apparatus housing 100. The alternative path 121 has a plurality of paired feed rollers (two pairs in the embodiment, 122 and 123) provided in a course thereof. The medium 3 having the development process made by the paired pressure developing rollers 68 is stabilized in the colorization while being fed on the alternative path 121 by the paired feed rollers 122 and 123.

In other words, the colorization needs some time (wait time) until the ink exudation stabilizes even after release of the pressure by the paired pressure developing rollers 68. To secure the wait time, the paired feed rollers 122 and 123 should be preferably made to rotate at the same rate as or a little faster than the paired pressure developing rollers 68, and the alternative path 121 should be preferably made longer. It should be noticed that the alternative path 121 can be set to a desired length according to the switchback distance of the switchback section 64. This allows the wait time to be set depending on the kind of ink used.

On the upstream of the paired feed rollers 122 is disposed a medium detecting sensor 125. If a downstream edge of the medium 3 fed on the alternative path 121 passes the medium detecting sensor 125, a signal output of the medium detecting sensor 125 synchronizes a cutting arrangement 72 to run, which will be described later.

A high-speed feed path 124 is provided in connection with an end of the alternative path 121 and extended through a top right side of the apparatus housing 100 to an outlet placed on a top left side of the apparatus housing 100.

The high-speed feed path 124 is provided with paired high-speed feed rollers 126 and the cutting arrangement 72. The paired high-speed feed rollers 126 are controlled to rotate at the same rate as or a little faster than the feed rollers provided in the apparatus housing 100 except for the paired pressure developing rollers 68 at least. The cutting arrangement 72 is arranged on the top of the apparatus housing 100 (top right side looking on the drawing) and serves to cut four margins of the medium 3.

The cutting arrangement 72 has paired slitter rollers 72a provided for cutting out the both right and left side margins of the medium 3 fed to come thereto and a cutter 72b for cutting out a leading and trailing end margins of the medium 3. With the cutting arrangement 72, first the medium 3 is cut out on both right and left side margins of a leading half thereof by the paired slitter rollers 72a while being fed, second the medium is halted and cut out on the leading end margin by the cutter 72b, third the medium is restarted to feed and cut out on both right and left side margins of a trailing half thereof by the paired splitter rollers 72a, and fourth the medium is halted again and cut out on the trailing end margin by the cutter 72b. For the cutting operation, a medium detecting sensor 128 is arranged in front of an upstream end of the cutter 72b to always sense the leading and trailing end positions of the medium 3 being fed on the upstream and downstream ends, thereby controlling timing of cutting out the leading end margin and the trailing end margin of the medium 3 by the cutter 72b. It should be noticed that the paired slitter rollers 72a are controlled to rotate at the same rate as the paired high-speed feed rollers 126.

Below the cutting arrangement 72 (higher portion of the apparatus housing 100) is arranged a containing section 75 for containing the margins cut out of the medium 3 therein, or the margin dust cut out by the cutting arrangement 72 and dropped into the containing section 75 to collect. In actual operation, the environment in the apparatus tends to generate static electricity as the atmosphere is at high temperature and the cut material is polyester. The static electricity causes sticking of the cut margins when the margins of the medium 3 are cut by the paired slitter rollers 72a and the cutter 72b, resulting in hard dropping of the margins and sticking on the inlet. For the reason, it is preferable that the containing section 75 should have copper tape attached thereto to eliminate the static electricity or be formed of a metal conductive material.

The high-speed feed path 124 on the downstream end of the cutting arrangement 72 has a bleaching section 77 for bleaching process.

The following describes the bleaching process briefly.

The media 3 exposed on the exposing stage 55 forms an image as it exudates necessary amount of die (ink) as being pressed. To obtain proper contrast, the medium 3 is exposed to an intermediate amount of light to make hardness of the microcapsules intermediate, thereby making the ink exudation intermediate. If the medium 3 is left in such a condition after pressing, the ink exudation proceeds. The medium 3 therefore cannot be fixed to a desired color. To prevent that, light is re-irradiated on the printing surface 3a of the medium 3 in the course of feeding from the cutting arrangement 72 to a post-heating section 80 (outlet, which will be described later). Such a process can completely cure the microcapsules that have not been fully cured yet. The printing surface 3a thus can keep stable print image for long time without color change.

The embodiment has the bleaching section 77 using the space above the exposing projector 60. In view of the fact that a considerable amount of the light emitted from the light source 60a of the exposing projector 60 (FIG. 2) is leaked out, the bleaching section 77 is arranged at a position where the leaked light can be used, that is, a position above the exposing projector 60.

It should be noticed that the printing surface 3a of the medium 3 is directed upward in the bleaching section 77, or in a direction opposite to the light source 60a, as the medium 3 is reverted by the switchback section 64. For the reason, to irradiate the leaked light down to the printing surface 3a, a mirror (not shown) is arranged above the exposing projector 60. It is preferable to set the paired feed rollers arranged in the bleaching section 77 to be driven at a speed a little slower than the ones arranged in the other feed paths in view of fast continuous process of the medium 3, as the bleaching exposure has to be made for a specific time for a desired effect.

On the downstream end of the bleaching section 77, or at the top left side of the apparatus housing 100, is disposed the outlet in which the post-heating section 80 is arranged.

The, post heating is to make a heating process for accelerating the coloring process as the coloring takes long time until the die (ink) develops its primary color. The post heat is made at 90 degrees C for one minute to virtually saturate exudation of the die, thereby preventing color change afterwards.

Making the medium 3 stay on the feed path is limited in connection with the medium 3 for continuous printing process to form the image on the medium 3 and lowers the production capability as will be described later. For the reason, the post-heating section 80 in the embodiment is formed of a room for continuously stacking the medium 3 vertically at a specific position and a temperature control arrangement, including a sensor and a heater, for keeping the room at a specific temperature. The room temperature is controlled to the desired one of 90 degrees C mentioned above.

The bleached medium 3 in the post-heating section 80 is led to paired retention guides 83 (medium guides) facing each other before position on leads of lead screws 81. The lead screws 81 are at positions at which four corners of the medium 3 can be stably supported. In the state, the paired retention guides 83 (medium guides) are moved away once before the lead screws 81 are rotated one turn to move the medium 3 down by one lead. The paired retention guides 83 (medium guides) then are returned to the medium bringing position to position the following medium 3 at the leads of the lead screws 81.

Such a repeated operation, including bringing the medium 3, positioning, and moving down, makes the medium 3 stay in the post-heating section 80. At the same time, the medium 3 is heated as will be described later to fully develop the color and prevent aging.

The lead screws 81 are further turned to make the medium 3 slip out of the leads in ascending order. The slipped medium 3 drops down to a feed belt (which will be described later). The medium 3 are fed on the feed belt to a discharge door (which will be described later). If the discharge door is opened, the medium 3 are discharged to a discharge tray (which will be described later).

It should be noted that a single driving arrangement is provided to control turning the lead screws 81 and making the feed belt travel (which will be described later).

In turn, the following provides additional description of the process sections arranged inside the printer 1.

First, construction of the medium cassette 5 to be received in the cassette room 2 is described below.

A multiple of sheets of the media 3 (around 500 sheets), as shown in FIGS. 3A and 3B through 5, are set up. The bunch of sheets is made to contact a back plate 4 of the same size as the medium 3 on the rear side wall thereof before being put into a package 10 that can be separated into an upper and lower halves. The package 10 is closely sealed with a laminated material (not shown) for storing and shipping. The package 10 may have the separatable upper and lower half packages 7 and 8 fixed together with screws or the like. Alternatively, the half packages 7 and 8 may be molded to have respective hooking features. It is advantageous that such a mold structure allows easy assembling and does not contain any metal or other dissimilar materials.

The upper package 7 has bosses 7a having a slope formed on a top thereof. The upper package 7 is structured to contain a powder or fluid humidity conditioning agent 17 therein replaceably or refillably that can adjust the humidity in the package 10. A slit 7b is formed at slope edges of the bosses 7a traversing the slopes.

The lower package 8 has a window hole 8a formed on a side wall thereof and a slit 8b formed on a bottom thereof, the slit 8b being close to the window hole 8a along the side wall having the window hole 8a. The bottom has a slit 8c in a direction traversing the slit 8b formed at around a center thereof.

Figures 3A, 3B:
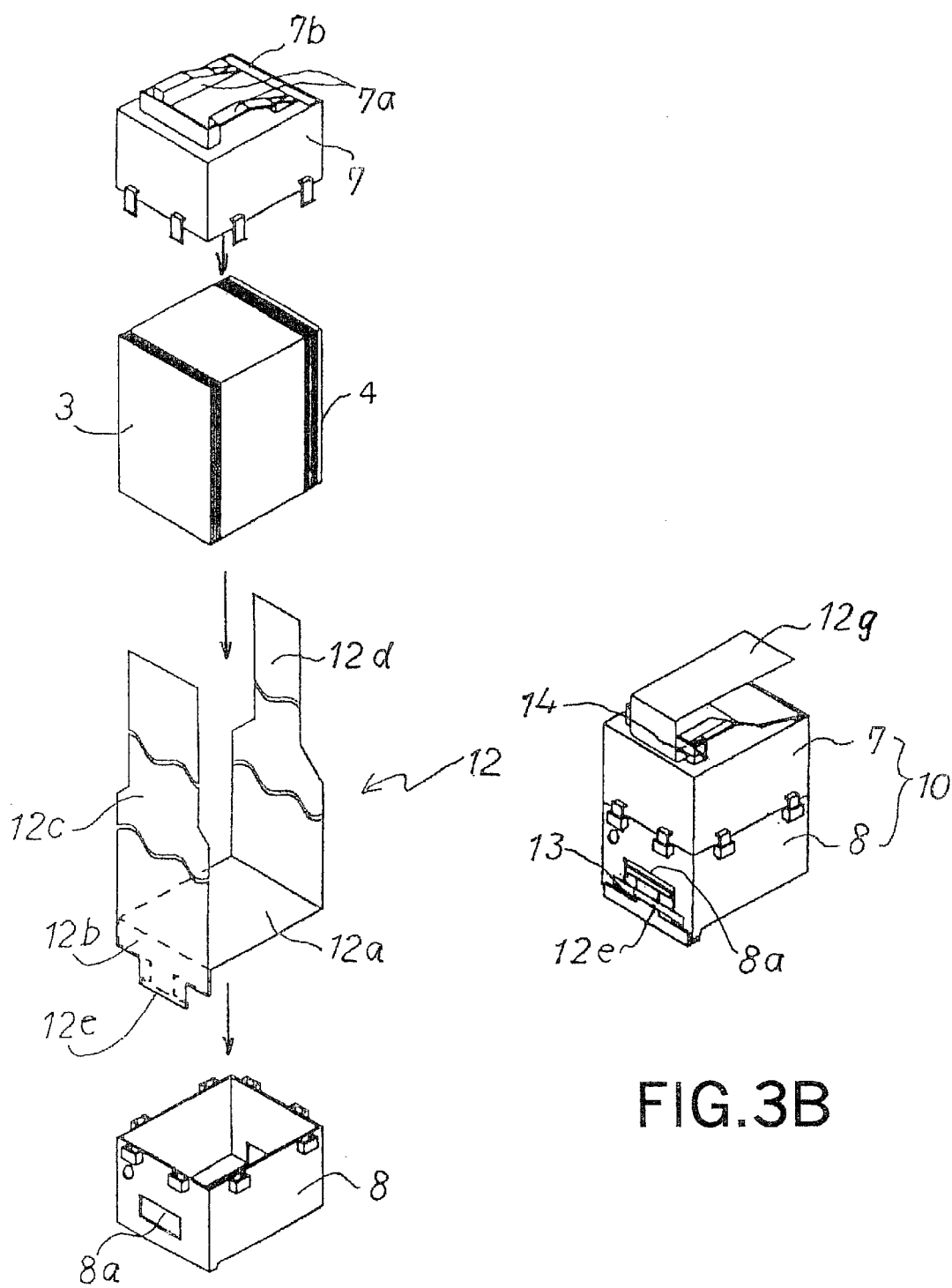

The medium 3 and the back plate 4 are contained in the package 10 as they are wrapped (roll wrapped) with a light shielding sheet 12. The 12, as shown in FIG. 3A, is shaped like horseshoe and has a folded part 12b formed on one bent edge of a bottom 12a thereof. The folded part 12b is put through the slit 8b, folded back, and fixed on the side wall of the lower package 8. The part folded back has a narrow part at an end thereof for ease of handling. The folded part 12b of the light shielding sheet 12 has a cutting part, for example, a perforation 12e, formed in a direction traversing the insertion direction. The cutting means, as another example, may be formed of a portion different in depth, a cut portion, or a portion bonded with a fragile material.

Containing the medium 3 into the package 10 should be made as follows (in a darkroom).

First, the light shielding sheet 12 should be attached to the lower package 8. For attaching, the folded part 12b should be inserted into the slit 8b of the lower package 8 to expose the perforation portion, folded back at the perforation portion, bonded to the side wall of the lower package 8 with a weak bonding agent, and further fixed with a tape 13 stuck thereon. In that state, the media 3 bundled vertically should be loaded in the lower package 8 together with the back plate 4. One side wall 12c of the light shielding sheet 12 should be bent along the media 3 and a top of the back plate 4 and overlapped on the other side wall 12d. A lapped portion 129 of the portion 12c and the portion 12d should be led out of the slit 7b of the upper package 7. The upper package 7 should be put over the lower package 8 and fixed together with a screw or the like. In leading the lapped portion 12g out, the lapped portion 12g should be pulled out to remove sag in the package. In that state, the lapped portion 12g led out should be closely fitted along the bosses 7a with the weak bonding agent before being stuck to a surface of the bosses 7a and fixed with tape 14. As a result, the media 3 and the back plate 4 are wrapped by the light shielding sheet 12, or the hole of the package is blocked up. The media therefore cannot be exposed to external lights.

Figure 5:
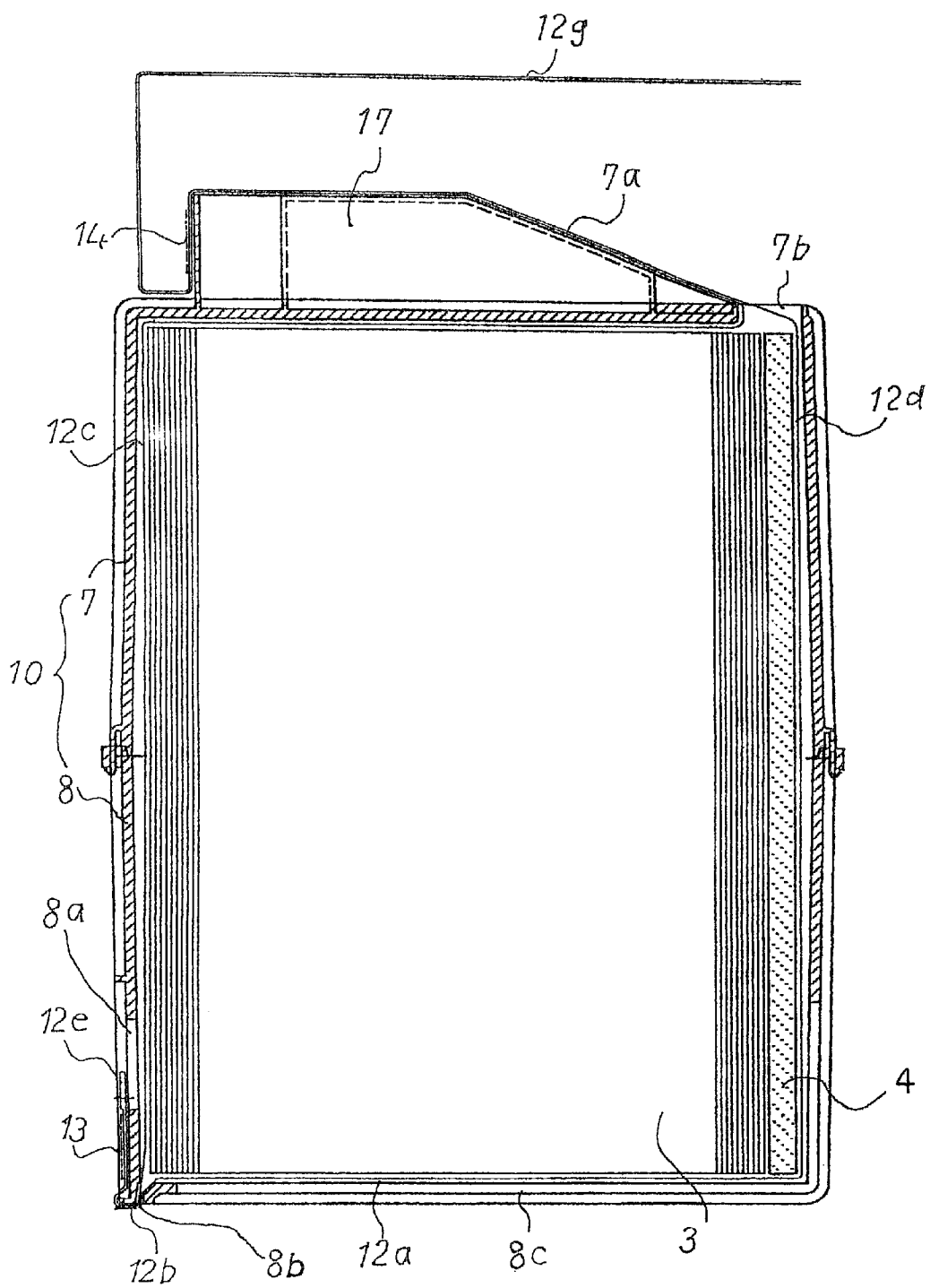
FIG. 5 is a cross-sectional view for structure of the package having the media contained.

FIGS. 3B and 5 illustrate the package 10 having the media 3 and the back plate 4 contained therein. The package 10 in that state is closely sealed with the laminated material (not shown) before being stored or shipped to a market. It is preferable that as the bosses 7a of the package 10 has the humidity conditioning agent 17 contained therein to make humidity control, the media 3 will not be degraded and can be stored for a long term. It is also preferable that as the light shielding sheet 12 is fixed with the tape, it is not peeled nor deviated during distribution.

It is further preferably possible to open the laminated material to load the media 3 in the package 10 into the medium cassette 5 (which is described below) without using a darkroom or the like as the media 3 are shielded against external lights by the wrapped light shielding sheet 12.

Figure 4A:
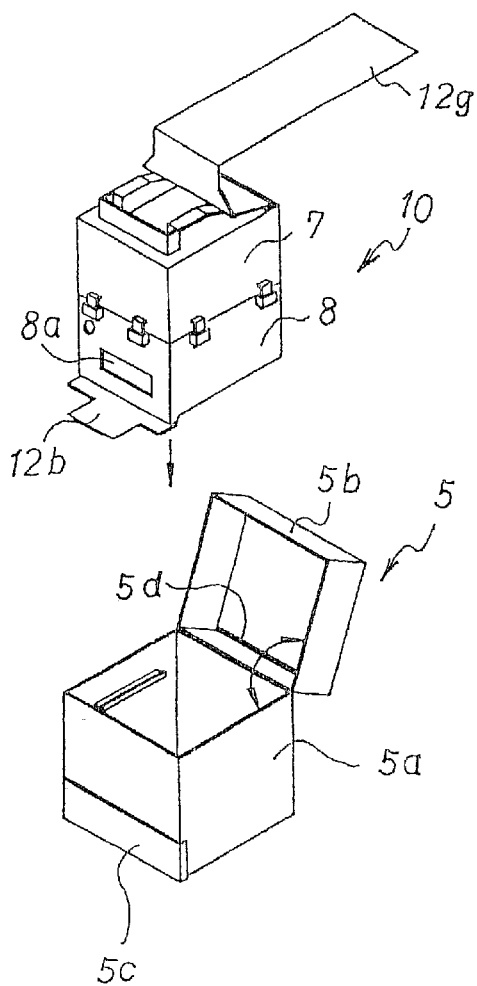

FIG. 4A illustrates that the package 10 structured as described above is loaded into the medium cassette 5. The package 10 can be loaded in the medium cassette 5 detachable from the printer body.

The medium cassette 5 has a cassette body 5a and a cassette lid 5b that can open and close the cassette body 5a with a hinge. The cassette body 5a has a shutter 5c provided on a side wall thereof, the shutter 5c being slidable corresponding to the window hole 8a of the package 10 to be loaded main body 5a. The cassette lid 5b has a slit Sd formed on a top edge thereof, the slit 5d having the lapped portion 12g of the light shielding sheet 12 put therethrough. The cassette body 5a also has slits (not shown) formed close to the shutter 5c on a bottom thereof, the slits corresponding to the slits 8b and 8c of the package 10 to be loaded respectively.

In turn, the following describes how to load the package 10 into the medium cassette 5 structured as described above.

First, for the light shielding sheet 12, the tape 14 on the package 10 should be peeled off, and the perforation should be cut out (FIG. 4A). In that state, the package 10 should be loaded into the cassette body 5a of the medium cassette 5. The folded part 12b of the light shielding sheet 12 should be put through the slit 5d of the lid 5b. The cassette lid 5b should be closed. In such a handling, also, the light shielding sheet 12 cannot be deviated as bonded to the package 10, and the media cannot be exposed to external lights, as described above.

Figure 4B:
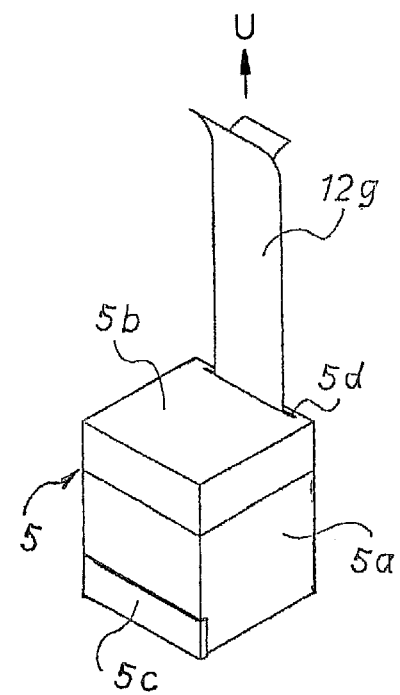

The lapped portion 129 then should be pulled out in a U direction shown in FIG. 4B to remove the light shielding sheet 12 having wrapped the media 3 to shield. The media 3 then can be loaded in the medium cassette 5 without exposure to external light. It should be noted that as the light shielding sheet 12 is cut out on the perforation, it can be easily pulled out with weak force. It is preferable to make an additional lubrication process on the light shielding sheet 12 for further easy pull-out handling. It is also preferable to attach an additional handle grip to the medium cassette 5 for easy handling.

The embodiment has the advantage that the package 10 and medium cassette 5 structured as described above allow the media 3 to be loaded into the medium cassette 5 through very easy steps at a light place without exposure to external light.

The media cassette 5 loaded in the package 10 having the media 3 contained therein, as described before, can be attached in the cassette room 2 in the printer 1 from a front side of the printer 1 shown in FIG. 1. For attaching, the printer 1 has a lid provided on a front panel thereof. The lid corresponds to the cassette room 2 and can be opened and closed. The lid can put the medium cassette 5 thereon with it opened. The lid has rails disposed thereon. The rails can have the medium cassette 5 put thereon and be pushed into the printer body. This allows easy loading the medium cassette 5 into the cassette room 2.

The cassette body 5a of the medium cassette 5 has identifying means 6 (boss) formed on a side wall thereof. The identifying means 6 can change an amount of the boss according to a type and a size of the media 3 in the package 10. The identifying means 6 can be mated with the sensor on the printer body to detect the type and size of the media 3 contained in the package 10.

Figure 6:
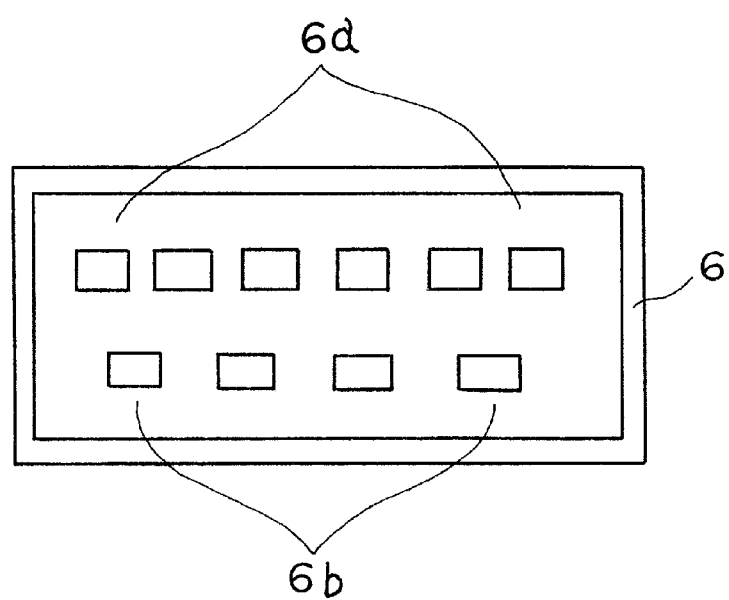
FIG. 6 is a view showing an example of identifying means.

As an example, as shown in FIG. 6, the identifying means 6 disposed on the medium cassette 5 has time limit ID key slots 6a formed for inserting a time limit ID key to know of a quality assurance time limit of the media 3 contained in the medium cassette 5. The identifying means 6 also has a medium ID key groove 6b formed for inserting a medium ID key to identify the type and size of media 3 contained in the medium cassette 5. The time limit ID key slots 6a are arranged for January and February, March and April, May and June, July and August, September and October, and November and December in rightward order in the figure. If the key is inserted in the January and February slot, for example, a timer calendar disposed on a PC board in the printer monitors the medium 3 to display warning in eight months later, i.e., September and October. To make the monitoring precise, of course, more key slots may be formed.

It should be noticed that after all the media 3 are consumed, the package 10 should be preferably reused, not discarded. The empty package 10 can be reused in the way that the empty package 10 should be taken out of the medium cassette 5, collected by a package manufacturer or the like, the upper package 7 and the lower package 8 should be opened and made to contain new media 3 at the steps described above. It is preferable for environment health. In such a recycling, also new humidity conditioning agent 17 should be preferably filled in for optimum humidity control as needed. It may happen that the media 3 cannot be consumed within a specific time limit, resulting in deterioration of picture quality, even with the cassette room 2 in the printer 1 temperature and humidity controlled. In the event, the package 10 may be collected with the media 3 left therein for reuse.

The package 10 and the medium cassette 5 structured in the embodiment have the advantage that as the recording media can be re-contained therein easily without exposure to external light in use, a recycling process can be established in view of environment. In addition, the recycled package also can be attached to the printer body easily, and the media can be stored for a long term without deterioration as the humidity is always controlled with the humidity conditioning agent. However, most of the humidity conditioning agents also are affected by temperature, so the temperature should be also controlled.

The following describes how to handle the package 10 and as an example, that in connection with the recycling process.

The produced media should be transferred to a package production site by temperature-controlled delivery means and stored in a temperature-controlled room, preferably in an air-conditioned heat insulating room, until use thereof. A newly produced package or a recycled and collected package should be used to contain a light shielding sheet and media at the package production site. In the containing work, the package should be filled with the humidity conditioning agent, or the recycled package should have the humidity conditioning agent replaced. The humidity conditioning agent is not limited to a solid form, but could be in other forms. Of course, the recycled package should be made different in the shape and filling method depending on the form of the humidity conditioning agent, solid or liquid.

The package containing the media should be wrapped with the laminate material as a medium pack. A number of the packages should be contained in a humidity-conditioned packing box before being delivered. In delivery, used packages should be collected at the same time the medium packs are sold to make it possible to establish the recycling process.

In the recycling process, it is preferable that a temperature-controlled room, preferably an air-conditioned storing room, should be prepared for temporarily storing the medium packs. A server should be preferably prepared to save quantity of the medium packs stored and arranged to allow a network to search it in online way. The server should be further built to allow a site having the printer installed thereat to access the server through the network to enter a necessary quantity of medium packs. Such a way makes it possible to start a production ordering system at the time a specific amount of medium packs in the storing room is used up. New packages or recycled packages then should be produced at the package production site, thereby making it possible to shorten a stock turnover period and keep quality of the media high.

The cassette room 2 also has a feeding device deposited for feeding the medium out of the package 10 one by one. The feeding device is described below. The feeding device has a shutter switching arrangement for opening or closing a shutter 5c of the medium cassette 5, a driving arrangement for driving the pick roller 101 abutting on the medium 3, and a pressing arrangement for always pressing and driving the medium 3 to the pick roller 101.

The shutter switching arrangement is driven to close the shutter 5c after a sensor or the like detects closing of the lid arranged on the front panel of the printer 1 that shields against external light after the medium cassette 5 is loaded in the cassette room 2. Alternatively, a link arrangement may be disposed on the lid for the printer 1 to drive the shutter switching arrangement when the lid is closed.

The driving arrangement for driving the pick roller 101 is driven when a sensor or the like detects closing of the shutter 5c of the medium cassette 5 to make the pick roller 101 abut on the surface of the medium 3 through the window hole 8a. The pick roller 101, when driven to rotate, feeds out the put-up medium 3 one by one to the above-mentioned feed path 51 through the slit 8b of the lower package 8 and a slit (not shown) formed on the cassette body 5a of the medium cassette 5.

The pressing arrangement is devised to drive a pushing pin abutting on the back plate 4 through a slit (not shown) of the cassette body 5a and the slit 8c formed on the package 10 when the medium cassette 5 is loaded in. The pushing pin is driven in synchronous with rotation of the pick roller 101 to always make the medium 3 on the pick roller 101 to continuously feed the medium 3 out, the medium 3 being the most left medium 3 in the attaching state of the medium cassette 5 in FIG. 1.

Figure 7:
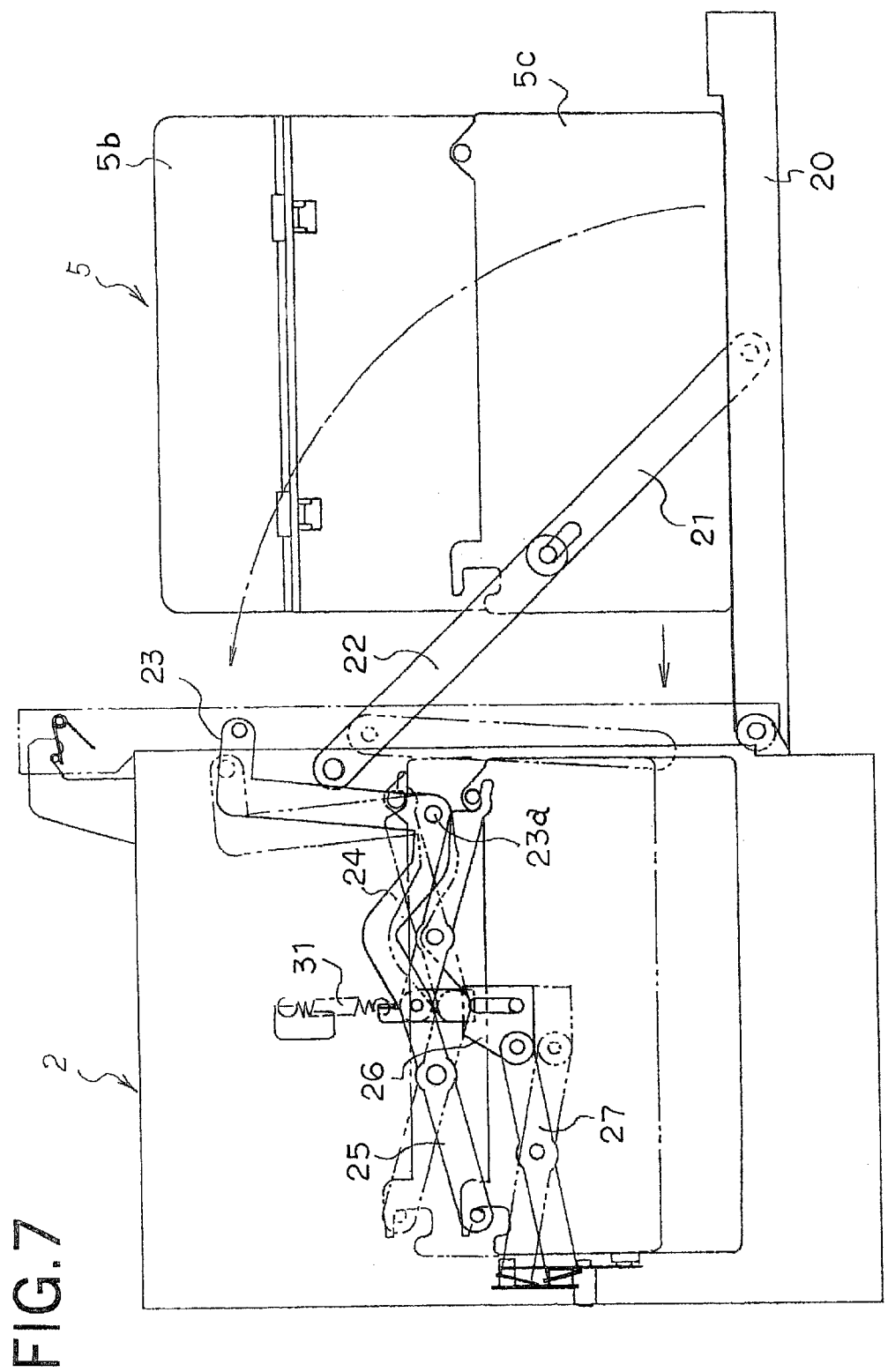
FIG. 7 is a side view for a cassette room in a printer body.
Figure 8:
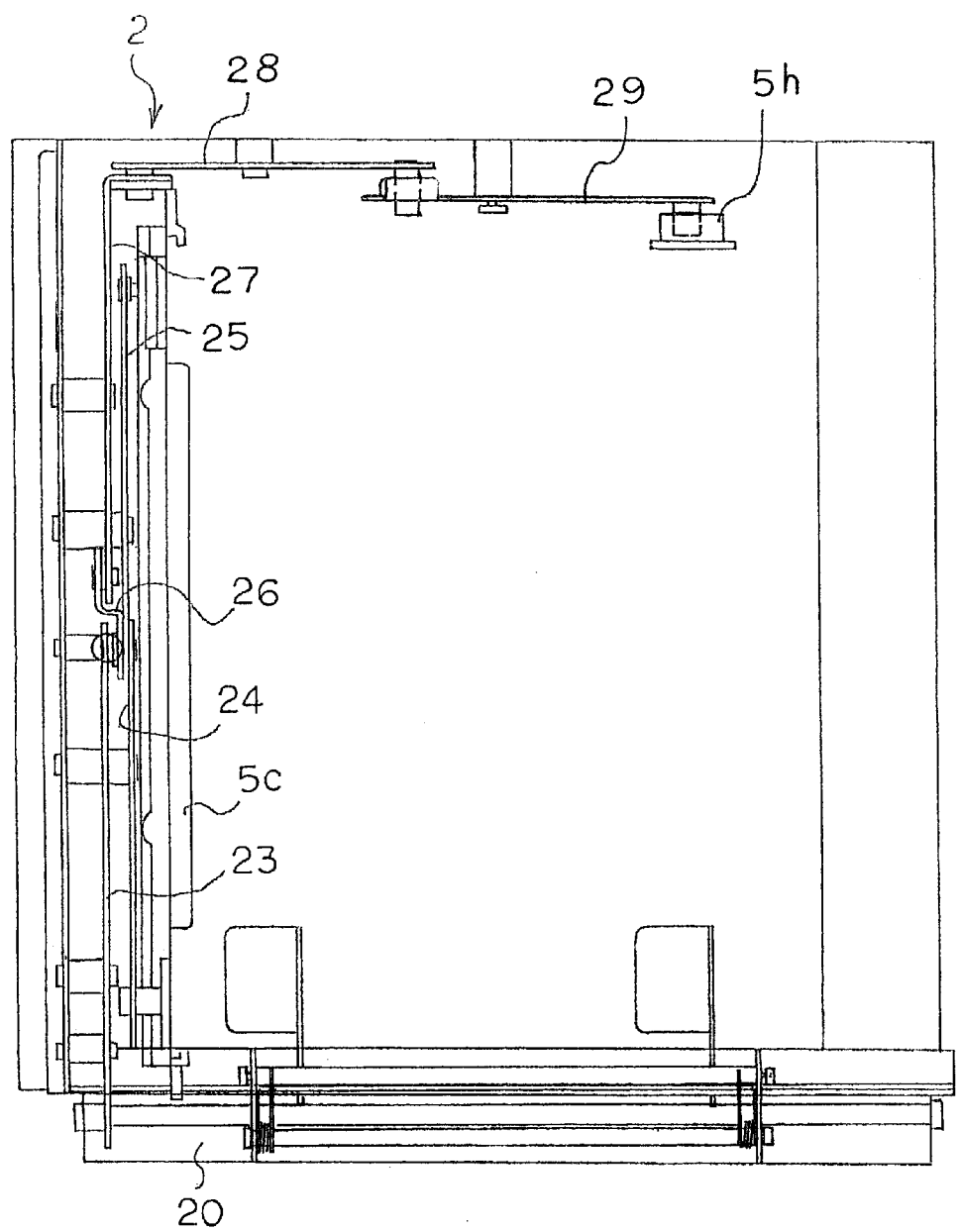
FIG. 8 is a top view for the cassette room in the printer body.
Figure 9:
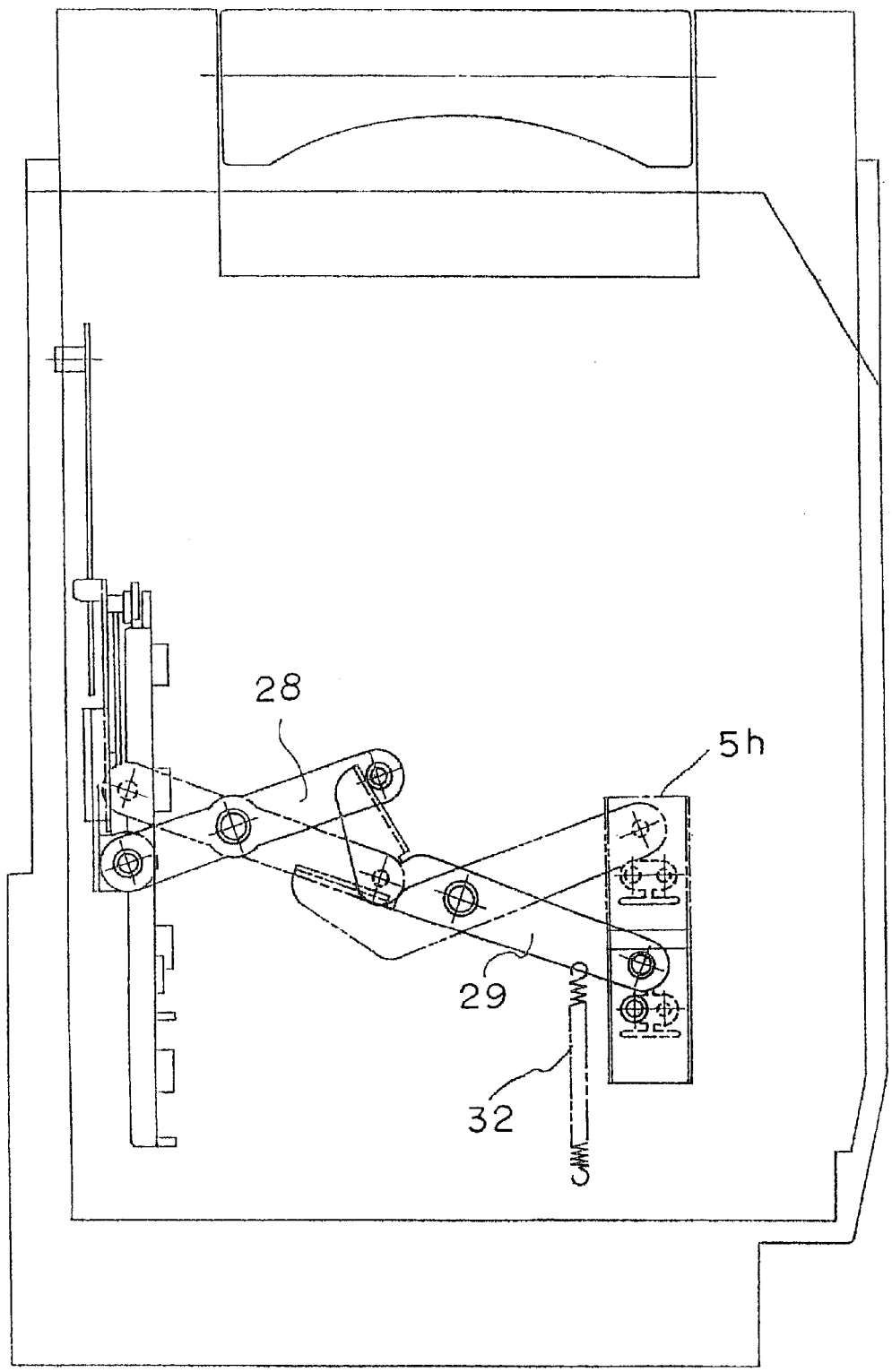

The following describes an arrangement for opening and closing the shutter 5c when the medium cassette 5 is pushed into the cassette room 2, by reference to FIGS. 7 through 9. FIG. 7 depicts a side view for the cassette room 2 with the lid arranged on the front panel of the printer 1 opened. FIG. 8 depicts a top view for the cassette room 2. FIG. 9 depicts a side view for the cassette room 2 with the medium cassette 5 contained therein.

Between a lid 20 and a frame in the cassette room 2 are disposed links 21 and 22 linked together in a direction of shaft. The links 21 and 22 are kept horizontal when the lid 20 is opened. The frame in the cassette room 2 also has a fulcrum 23 disposed thereon that is pushed in when the lid 20 is closed. The fulcrum 23 drives links 24 and 25 when turned with a center of a fulcrum 23a. That is, respective ends of the links 24 and 25 are moved up when engaged with the shutter 6c of the medium cassette 5 with the fulcrum 23 turned with the center of the fulcrum 23a. This opens the shutter 5c of the medium cassette 5 when the lid 20 is closed, thereby making it possible for the pick roller 101 and a medium existence sensor to access as will be described later.

The fulcrum 23 is linked with a link 27 via a joint 26. The link 27 is engaged with a link 27 disposed at a rear of the cassette room 2. The fulcrum 23, when turned, moves the joint 26 down to turn the link 27 and at the same time, turn the link 28. The link 28 is linked with a link 29 engaged with a shutter 5h disposed in the medium cassette 5. The link 28, when driven, turns the link 29 to move up and open the medium cassette 5. The shutter 5h, when opened, makes a back plate position detecting sensor (which will be described later) accessible.

It should be noticed that the shutters 5c and 5h have to be closed so as not to expose the medium 3 to external light when the medium cassette 5 is in the cassette room 2 and the lid 20 is open. For the reason, the links 24 and 29 have tension springs 31 and 32 attached thereto respectively. The tension springs 31 and 32 urge the links 24 and 29 not to allow the shutters to open when the lid 20 is open.

Figure 10:
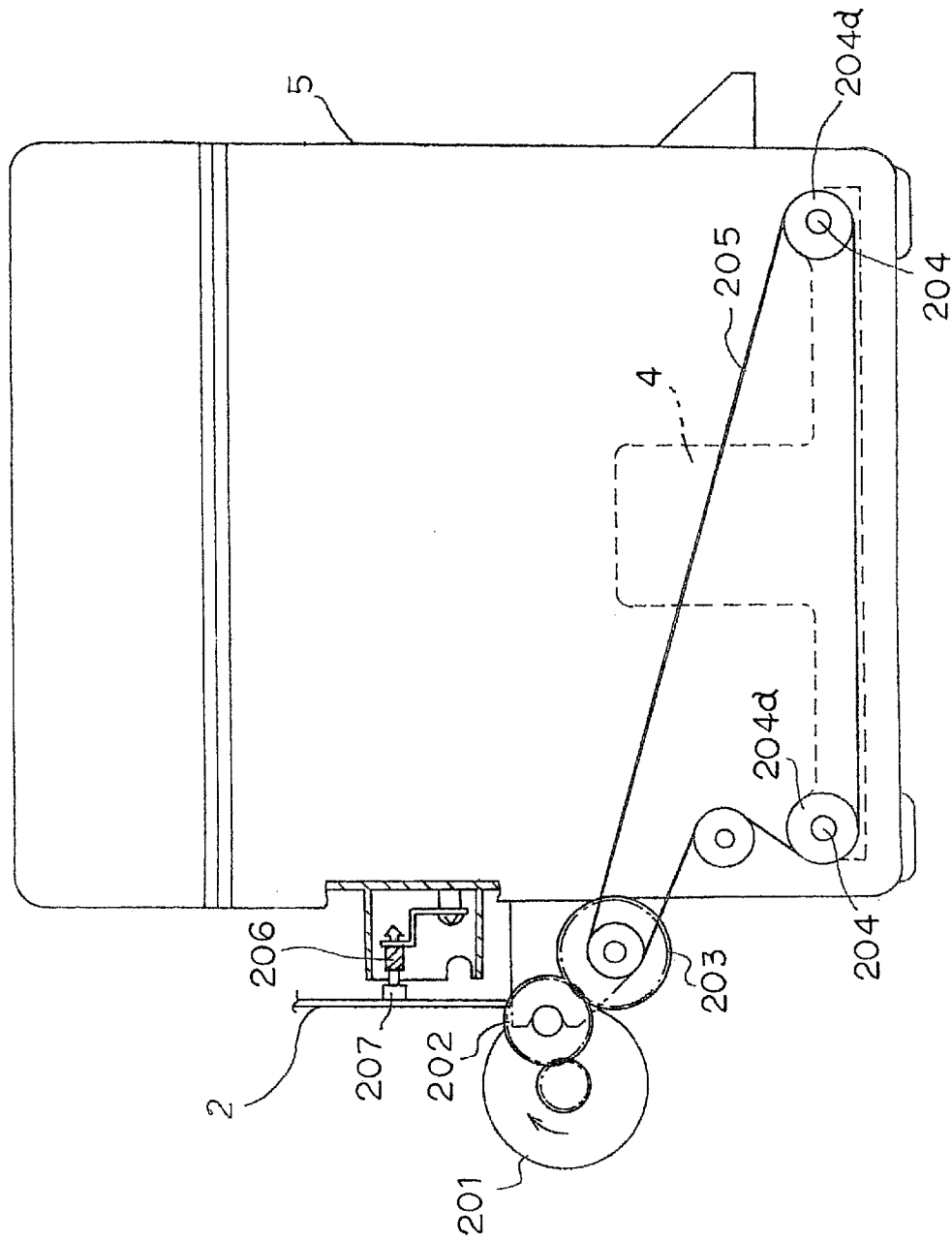
FIG. 10 is a view for a driving arrangement for driving a back plate in the medium cassette.
Figure 11:
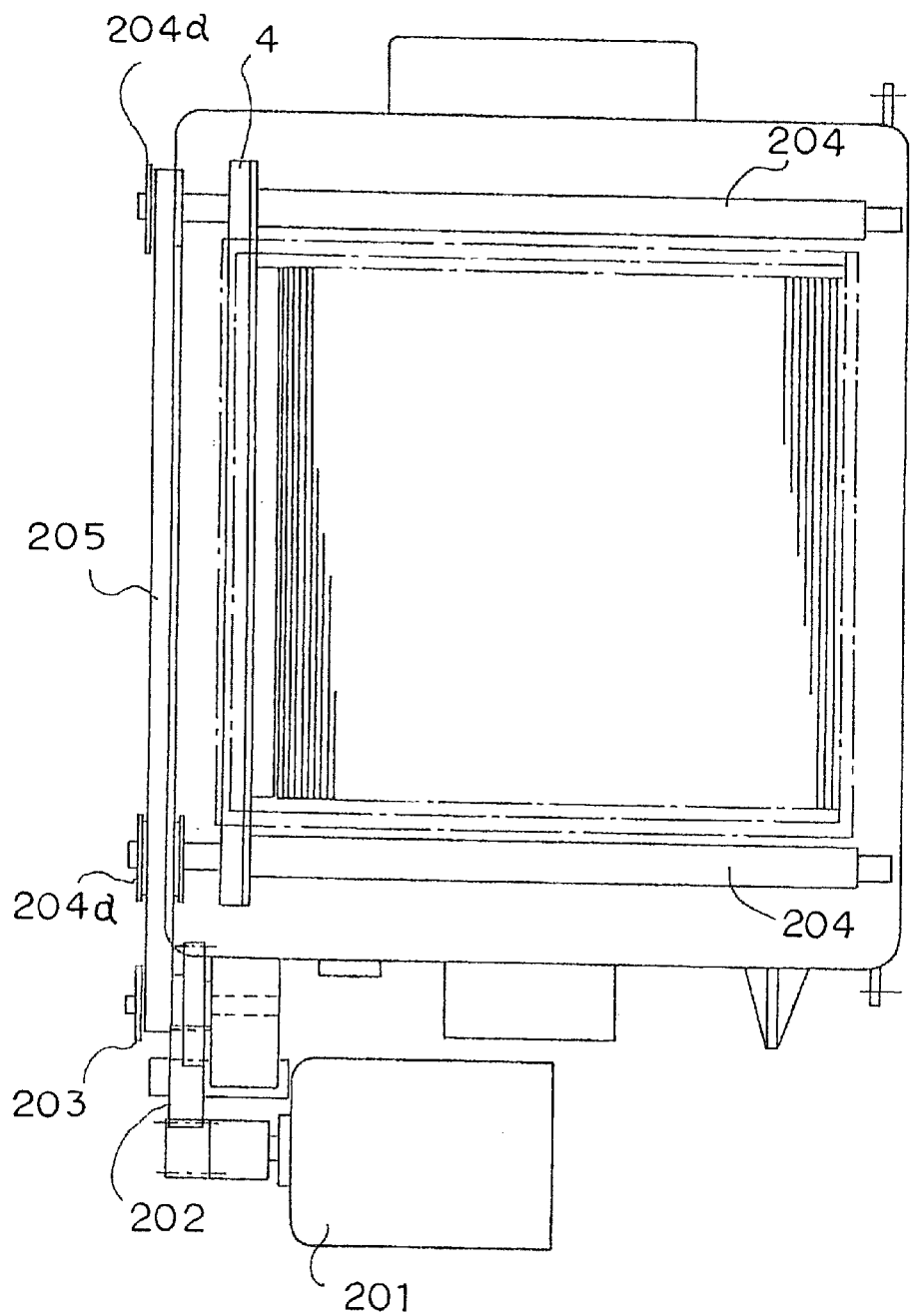
FIG. 11 is a top view for the driving arrangement shown in FIG. 10.

In turn, the following describes an arrangement disposed in the medium cassette 5 for driving the back plate 4 contained therein, by reference to FIGS. 10 and 11.

The back plate 4 is driven by a motor 201 held in the cassette room 2. A rotation driving shaft of the motor 201 is meshed with a gear 202 for reducing the rotation to increase the torque. The gear 202 is disposed on the medium cassette 5 side and meshed with a gear pulley 203 to reduce the rotation to increase the torque. The medium cassette 5 also has paired lead screws 204 disposed on a lower place thereof in parallel with a bottom thereof. The paired lead screws 204 are driven to rotate by the motor 201 via a belt 205 stretched among the gear pulley 203 and pulleys 204a mounted on respective lead screw shafts. When the medium cassette 5 is loaded in the cassette room 2 and the lid 20 is closed, the gear 202 and gear pulley 203 are meshed with each other to allow the motor 201 to transmit driving force thereof. The back plate 4, as described above, has the bosses disposed thereon to have the paired lead screws 204 screwed therein. The paired lead screws 204, when driven to rotate by the motor 201, drive the back plate 4 toward the pick roller 101 side.

The medium cassette 5 has identifying means 206 (boss) formed on a side wall of which the amount of the boss can be changed to adjust depending on the type and size of the media 3 in the package 10 loaded therein. The identifying means 206 is detected by a sensor 207 disposed in the cassette room 2 for detecting a pushing pressure when the medium cassette 5 is loaded in place. This allows detection of the type and size of the media 3 contained in the media cassette 5 loaded in without opening the lid 20, or without exposing the media 3 to external light. Of course, the identifying means 206 and the sensor 207 for detecting it may be optical ones instead of the mechanical ones described above. The identifying means 206 also may be made unchangeable for adjustment. In such a structure, the medium cassette 5 should be selected to correspond to the media 3 to be contained therein, from among medium cassettes having the identifying means corresponding to the respective types and sizes of the media 3.

A sensor 208 for detecting a saving position for the back plate 4 is positioned as shown in FIG. 12A when the shutter 5h of the medium cassette 5 is opened. The sensor 208 can detect a limit position in a saving direction not to press the medium 3. The detection signal is used to stop the driving arrangement for the back plate 4. In detail, as shown in FIG. 12B, the back plate 4 has a boss disposed thereon. The boss abuts on a lever 209 to turn with a center of a fulcrum thereof when the back plate 4 comes to the limit position in a saving direction thereof. In conjunction with the motion of the lever 209, a lever 210 is turned with a center of a fulcrum thereof to shield the sensor 208 to detect the limit position, thereby stopping the motor 201 from driving. It should be noticed that the lever 209 is urged to a nondetection side of the back plate 4 by a spring 211, and the lever 210 is urged to a nondetection side of the back plate 4 by a spring 212

Figure 13:
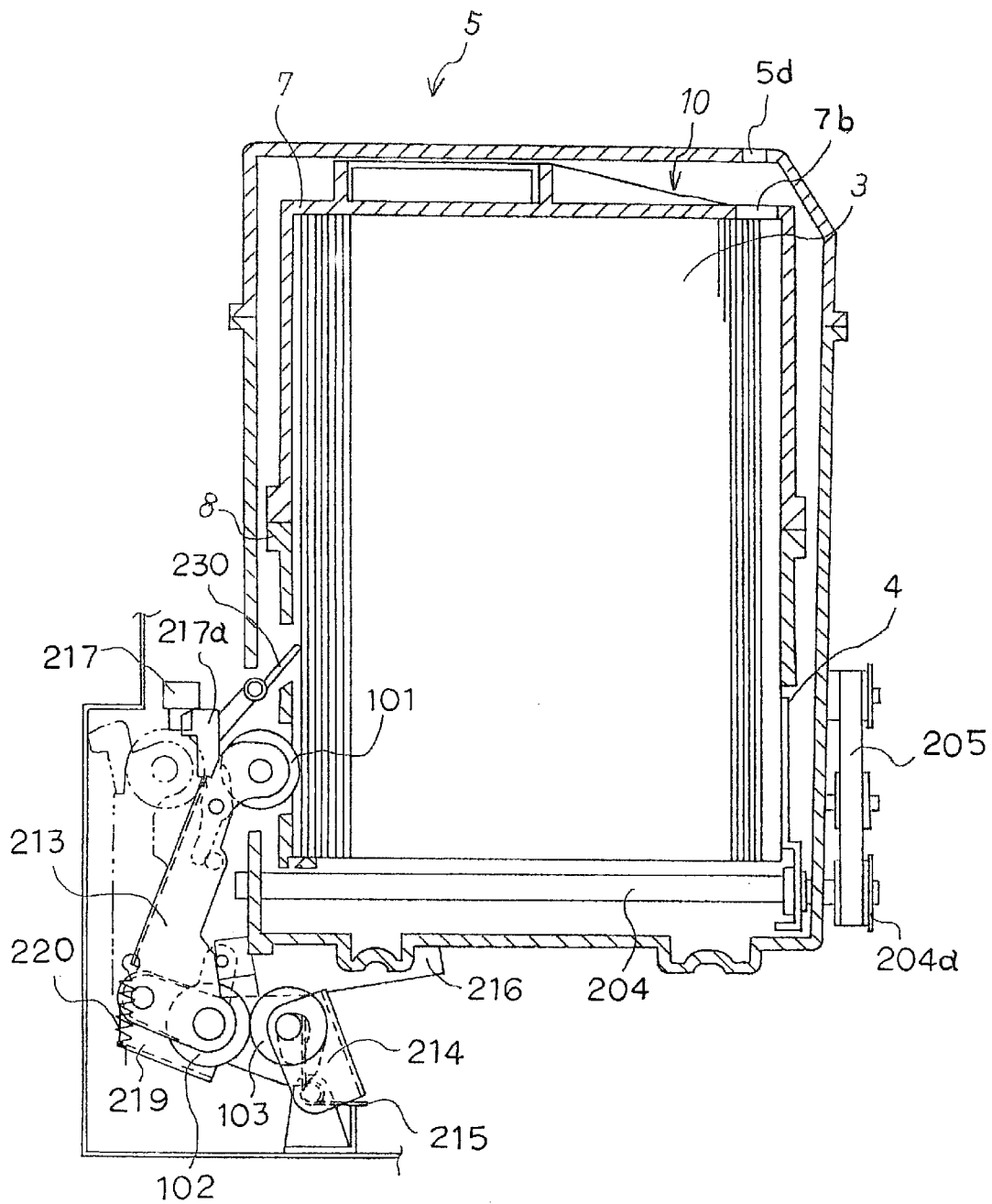
FIG. 13 is a top view for the cassette room.

When the shutter 5c of the medium cassette 5 is opened, the open portion has the pick roller 101 put therein as shown in FIG. 13. The pick roller 101 is held on a frame 213. The frame 213 can move with a center of the driving shaft of the feed roller 102 arranged on the downstream end of the cassette room 2. With the movement, the feed roller 102 and the separating roller 103 for separating one medium sheet abut on each other as the frame 213 does not press the shaft of the feed roller 102 when the pick roller 101 comes to the position to press. It should be noticed that the separating roller 103 is held on a frame 214 and can move with a center of rotation of the frame 214. The separating roller 103 is pressed against the feed roller 102 by a spring 215. The feed roller 102 and the separating roller 103 are released from nipping as the frame 214 is pushed on a shaft thereof when the frame 213 comes to a saving position thereof.

The pick roller 101 is abutted on the medium 3 by attraction of a solenoid 216. The medium cassette 5 has a pick face detecting sensor 217 disposed thereon. The pick face detecting sensor 217 detects the pick roller 101 as the pick roller 101 is returned with the medium 3 pushed out to the pick roller 101 side by the back plate 4 when the pick roller 101 is pressed against the medium 3 by the attraction of the solenoid 216. For the operation, the frame 213 has a sensor plate 217a attached thereon. The sensor plate 217a shields the pick face detecting sensor 217 for detection of a pressing position of the pick roller 101.

Figure 14:
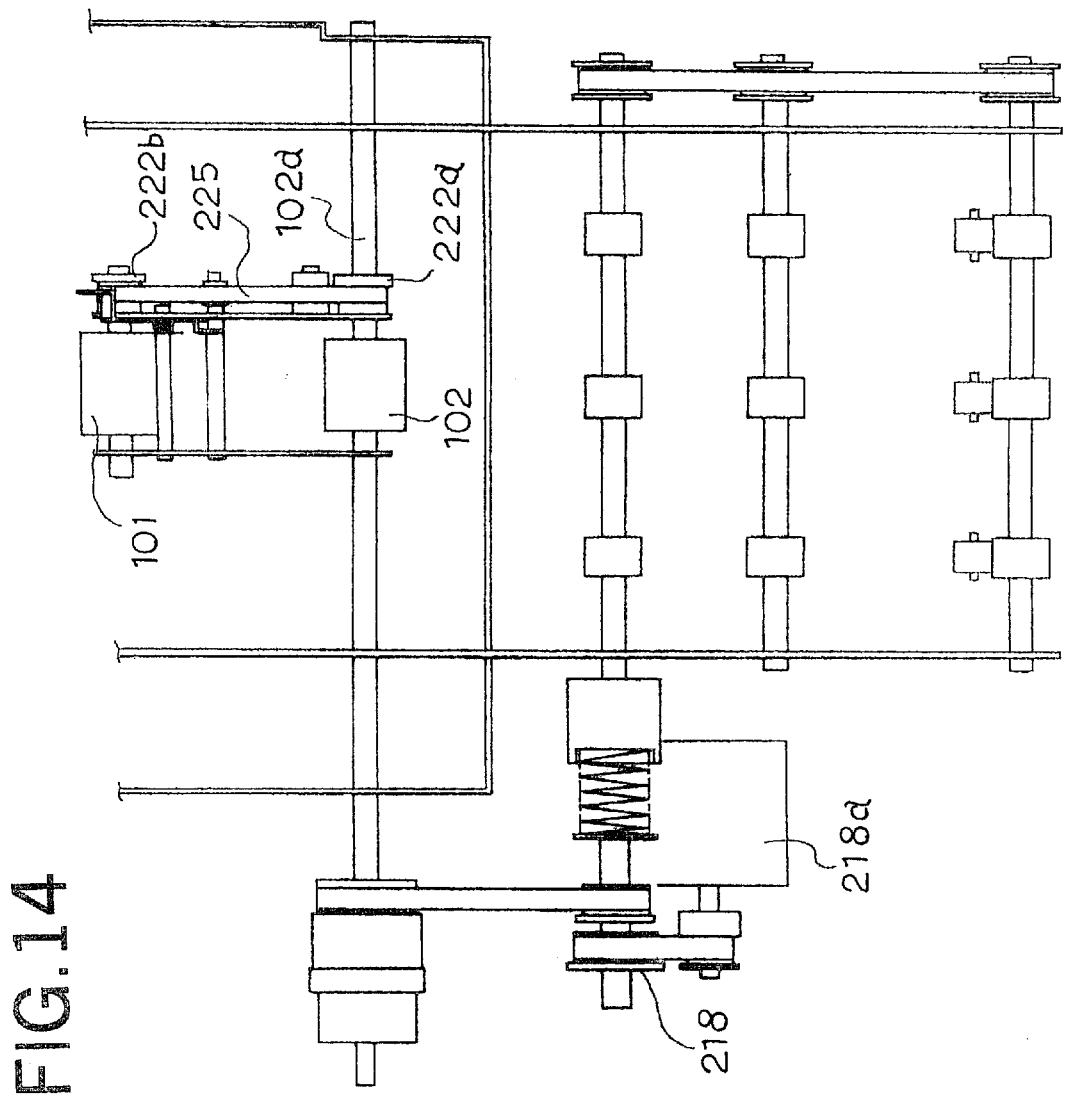
FIG. 14 is a view for a driving arrangement for driving pick rollers and feed rollers.

Driving the pick roller 101 and the feed roller 102, as shown in FIG. 14, is made by a medium feeding arrangement 218 linked with a motor 218a. That is, driving force from the medium feeding arrangement 218 is transmitted to a drive shaft 102a of the feed roller 102. A given driving force, in turn, is transmitted to the pick roller 101 by a belt 225 stretched between a pulley 222a disposed on the drive shaft 102a and a pulley 222b disposed on the pick roller shaft, the feed roller 102 and the pick roller 101 being driven in synchronous with each other.

Figures 15A, 15B:
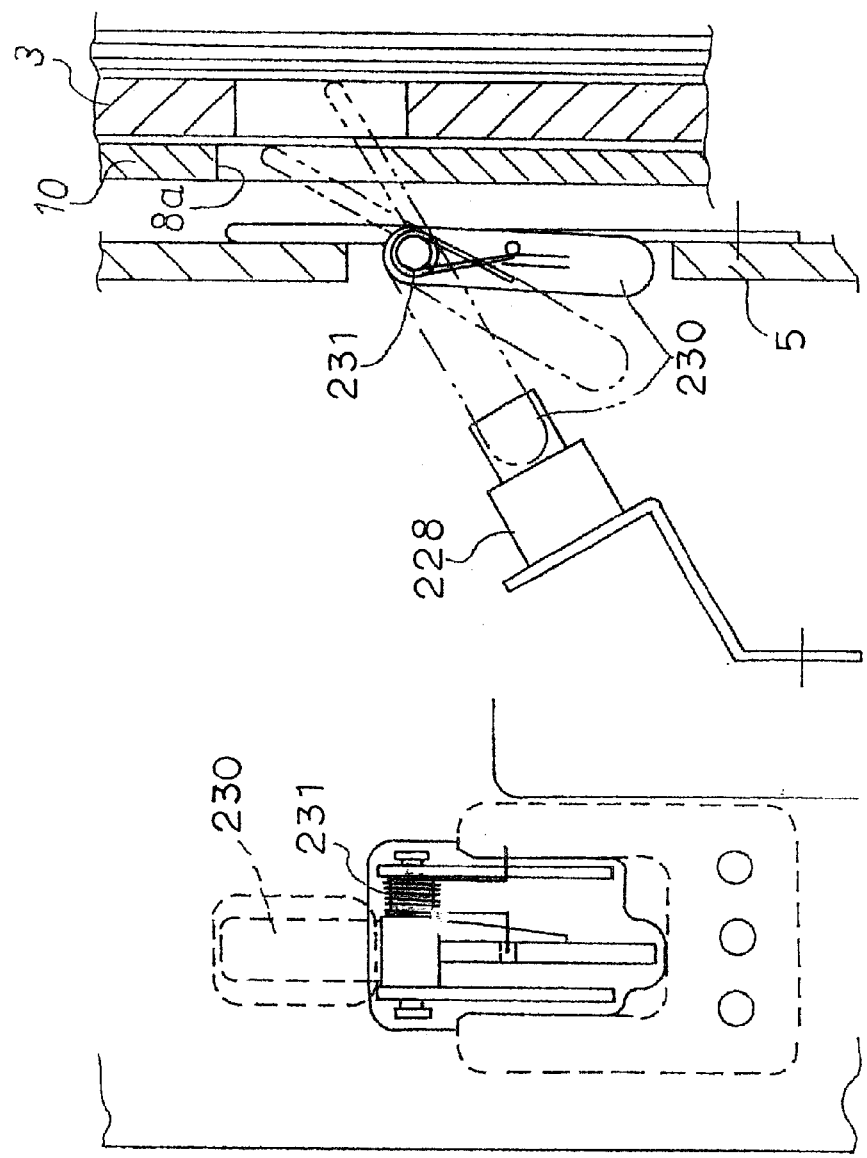
FIG. 15A is a side view for the detecting device for detecting existence of the medium.
FIG. 15B is a front view for the detecting device shown in FIG. 15A.
Figure 16:
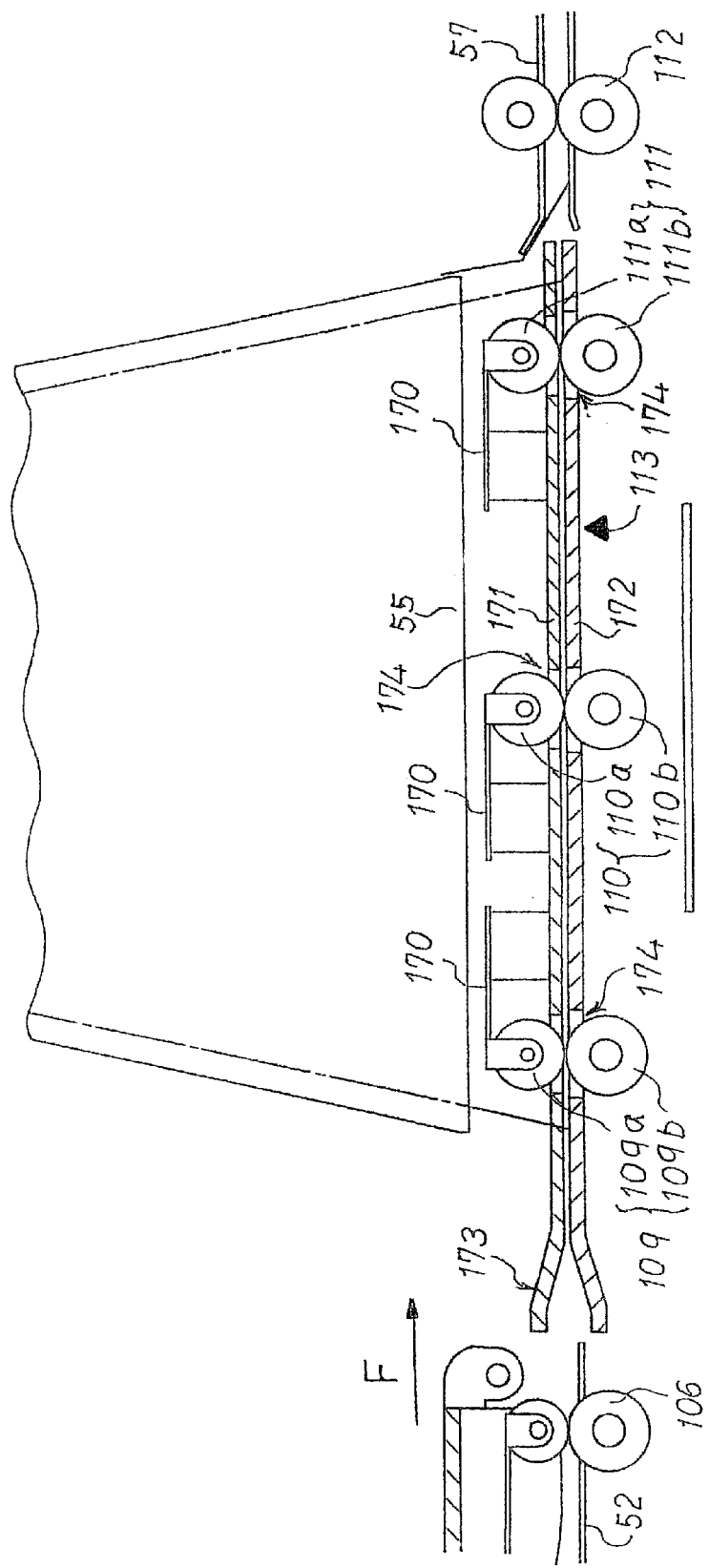
FIG. 16 is an enlarged side view for structure of a stretching arrangement provided in an exposing stage.
Figure 17:
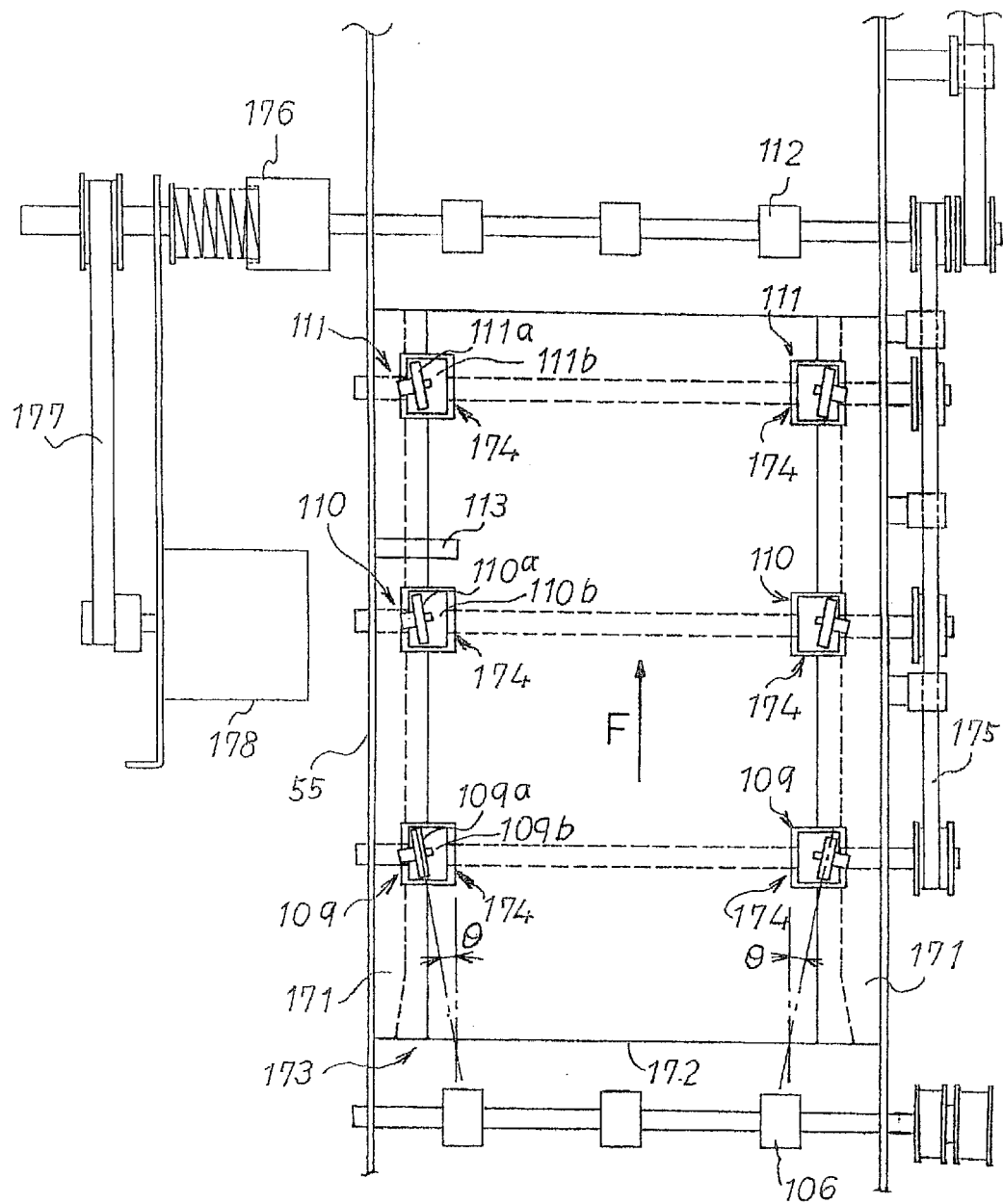
FIG. 17 is an enlarged top view for structure of the stretching arrangement provided in the exposing stage.
Figure 18A:
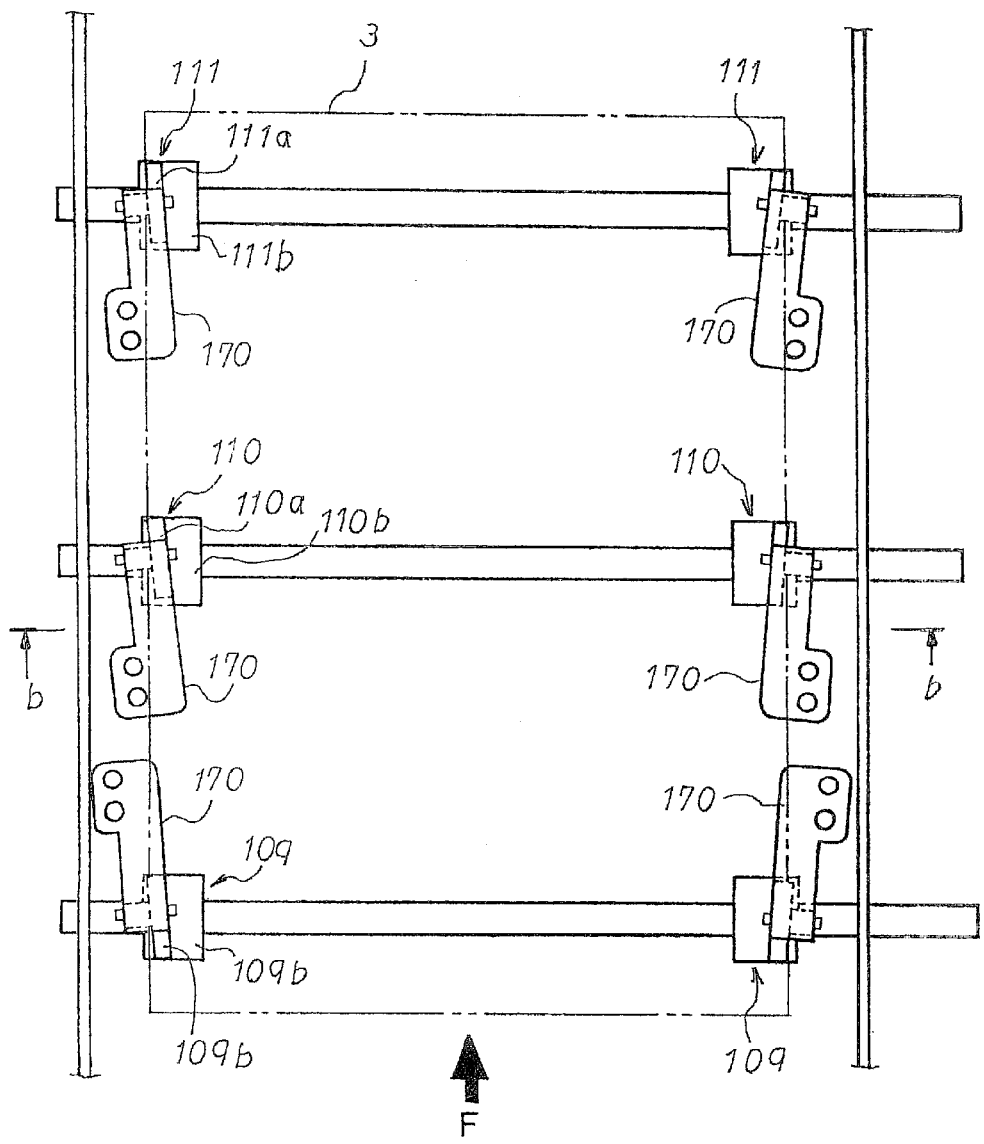
FIG. 18A is an enlarged top view for structure of the stretching arrangement provided in the exposing stage and shows an operation that the medium is fed by the stretching arrangement.
Figure 18B:
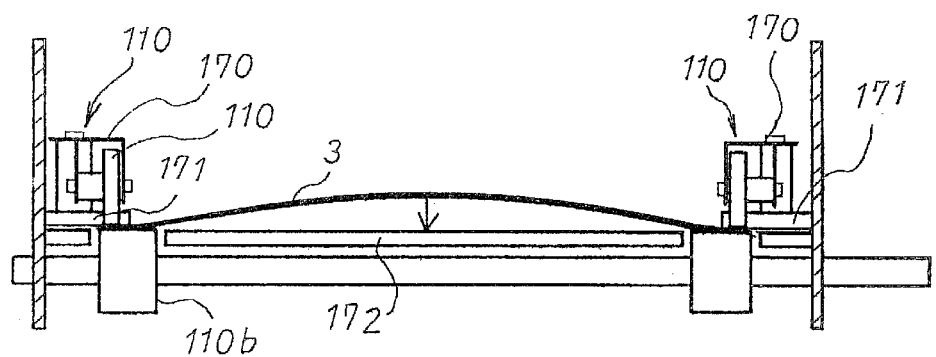
FIG. 18B is a cross-section view along a line b—b in FIG. 18A.

A sensor 228, as shown in FIGS. 13, 15A, and 15B, is arranged for detecting existence of the medium 3 in the medium cassette 5 at a portion in which the pick roller 101 is put. In detail, a turnable lever 230 is supported on the medium cassette 5 so that an end thereof can protrude into the window hole 8a of the package 10. The lever 230 is always urged to a side having no medium 3 by a spring 231. On a root end of the lever 230 is arranged the sensor 228. With such a structure, a leading edge of the lever 230 is released from abutting on the medium 3 to allow the root end of the lever 230 to turn to shield the sensor 228 when no medium 3 exist, thereby detecting presence or absence of the medium 3.

In turn, following describes operation from insertion of the medium cassette S into the cassette room 2 to feeding the medium 3.

First, the lid 20 is opened to engage the medium cassette 5 having the light shielding sheet 12 taken out with the rails on the lid 20, the medium cassette 5 is pushed into the cassette room 2, and the medium cassette 5 is set at a specific position before being closed. The lid 20, when closed, presses an end of the fulcrum 23 to,drive. The end drives the both ends of the links 24 and 25 to move up. This means that closing the lid 20 (making a dark room state) opens the shutter 5c of the medium cassette 5 not to allow the media 3 thereinside to be exposed to external light. Press-driving the fulcrum 23 drives the shutter 5h of the medium cassette 5 up to close via the joint 26 and the links 27, 28, and 29.

Closing the shutter 5c makes the pick roller 101 and the sensor 228 accessible. Opening the shutter 5h makes the sensor 208 accessible.

When the medium cassette 5 is set completely, the identifying means 206 and the sensor 207 detect the type and size of the media 3 inside the medium cassette 5. This means that the type and size of the media 3 contained in the medium cassette 5 loaded in can be known without opening the lid 20. Detection of the type of the media 3 by the sensor allows control means to have medium feeding conditions decided in advance and allows exposure conditions, development conditions, a dark time, a wait time, a post heating time, and other factors to be programmed to optimum ones for a specific medium on the bases of medium conditions acquired in advance.

When the shutter 5c of the medium cassette 5 is opened before the sensor 228 detects existence of the medium 3, the solenoid 216 attracts the pick roller 101 to make it access into the shutter Sc before abutting on the medium 3. It is advantageous that jamming paper can be got rid of easily as the feed roller 102 and the separating roller 103 are made to abut on each other with the pick roller 101 abutting on the medium 3.

When the pick roller 101 abuts on the medium 3, the back plate 4 is driven toward the pick roller 101 side by the motor 201. The medium 3 then is moved toward the pick roller 101 side to press pick roller 101. The sensor plate 217a attached on the frame 219 detects the pick face detecting sensor 217 at a position to stop the back plate 4, the position being a pick sheet feed position. A spring attached between the frame 213 and the frame 219 provides a pressing force for the pick roller 101.

With the medium feeding arrangement 218 driven, the feed roller 102 is driven to rotate and in synchronous with it, the pick roller 101 is driven to rotate. This allows the medium cassette 5 to feed the medium 3 to the feed roller 102 for proceeding with feed operation. The medium separating arrangement in the medium cassette 5 and the separating roller 103 prevent overlapping feed.

The medium 3 can be continuously fed out to the feed path as the pick roller 101 is driven intermittently. Afterwards, the exposing section, the developing section, and the post heating section make exposure, development, and heating processes respectively.

It should be noticed that if the sensor 228 detects absence of the medium 3, the back plate 4 moves to the limit position in the saving direction before stopping and at the same time, it signals that no medium 3 exists in the medium cassette 5.

In turn, the following describes the exposing section and related arrangements.

For the exposing stage 55, as shown in FIGS. 16 through 18A and 18B, the printer 1 in the embodiment has a stretching arrangement for stretching the medium 3 plain while protecting the printing surface 3a and a guiding arrangement for guiding the medium 3 in the specific feed directions while positioning the medium 3 to the specific positions.

The stretching arrangement has a plurality of paired feed rollers (the paired feed rollers 109, 110, and 111 in the embodiment) arranged for both sides of the medium 3 (arrow F direction in FIGS. 16 and 18A) and for both sides of the medium 3 out of the printing surface 3a (both side edges of the medium 3 cut by the cutting arrangement 72) in the feed direction. The paired feed rollers apply specific feeding forces to the medium 3 while pressing and rotating. Rollers of those paired feed rollers 109, 110, and 111 on one side apply the respective feeding forces to the medium 3 while opening out by specific angle E (FIG. 17) in the feed direction. In detail, the paired feed rollers 109, 110, and 111 are formed of: nip rollers 109a, 110a, and 111a capable of pressing the medium 3 from the printing surface 3a side and applying the respective feeding forces to the medium 3 while opening out by the specific angle θ in the feed direction; and feed rollers 109b, 110b, and 111b capable of pressing the medium 3 from back sides of the printing surface 3a side and applying the respective feeding forces to the medium 3, facing the nip rollers 109a, 110a, and 111a respectively.

It should be noticed that the feed rollers 109b, 110b, and 111b are linked together by a single endless belt 175. The endless belt 175 is linked with the paired feed rollers 112. The gear arrangement 176 is connected to a motor 178 via a belt 177. With such a driving system as described above, a driving force of the motor 178 is transmitted through the belt 177 to the gear arrangement 176 to reduce a speed for increasing a torque before being transmitted through the paired feed rollers 112 and the endless belt 175 to the feed rollers 109b, 110b, and 111b. With the feed rollers 109b, 110b, and 111b rotated, the nip rollers 109a, 110a, and 111a pressed to the feed rollers 109b, 110b, and 111b respectively, are rotated to apply the specific feeding forces to the medium 3.

The stretching arrangement also has an angle adjusting arrangement disposed for arranging the nip rollers 109a, 110a, and 111a at the specific gradient angle θ with respect to the feed direction of the medium 3.

The angle adjusting arrangement has leaf spring members 170 disposed therein for supporting the nip rollers 109a, 110a, and 111a at leading edges thereof individually and at the same time, pressing the nip rollers 109a, 110a, and 111a to the respective feed rollers 109b, 110b, and 111b. The leaf spring members 170 are attached at roots thereof on first guide 171 of the guiding arrangement (which will be described later). It should be noticed that the gradient angle 0 of the nip rollers 109a, 110a, and 111a can be properly changed by adjusting an attaching angle of the leaf spring members 170 with respect to the first guide 171. The leaf spring members 170 can be attached in various ways known currently, such as fastening the roots of the leaf spring members 170 to the first guide 171 with bolts or screws or integrating bosses on the roots of the leaf spring members 170 before forcibly inserting them into openings formed on the first guide 171.

In the structure, the nip rollers 109a, 110a, and 111a on the both sides in the feed direction can be set to have the same gradient angle 0 to apply to the medium 3 the feeding forces that can symmetrically open at the gradient angle θ in the feed direction. The structure has the advantage that the medium 3 is fed on a center line of the exposure path (exposing stage 55) and at the same time, its printing surface 3a is stretched plain to get rid of curls and wrinkles while being protected. To keep the medium 3 on one side in the feed direction in feeding, on the other hand, the nip rollers 109a, 110a, and 111a on the both sides in the feed direction can have the gradient angle 0 changed relatively. As an example, the gradient angle on one side (right side in FIG. 17) can be changed to α, and the one on the other side (left side in FIG. 17) can be changed to β, provided that β should be greater than α or β=0. The structure has the advantage that the medium 3 is fed on a side line of the exposure path (exposing stage 55) and at the same time, its printing surface 3a is stretched plain to get rid of curls and wrinkles while being protected.

In the structure described above, the medium 3 is stretched by the gradient-arranged nip rollers. Alternatively, the nip rollers can be continuously enlarged in diameter outward to provide similar effects. In that structure, the nip rollers 109a, 110a, and 111a should be aligned in the same directions (feed directions) as the feed rollers 109b, 110b, and 111b before being fixed.

In turn, the following describe the guiding arrangement. The guiding arrangement has: the first guide 171 provided for guiding the medium 3 on the printing surface 3a side of the medium 3 and on the both side positions out of the printing surface 3a, or on both side edges of the medium 3 to be cut by the cutting arrangement 72 described above; and, a second guide 172 provided on the back side of the printing surface 3a and for guiding the medium 3 while supporting the medium 3 on the back side.

The first and second guides 171 and 172 have a take-in part 173 disposed on an upstream end in the feed direction, or on a take-in side end right before taking the medium 3 onto the exposing stage 55. The take-in part 173 has an inside diameter (in vertical and horizontal directions) made continuously large toward the upstream end in the feed direction. In other words, the take-in part 173 has the inside opening size made continuously small from the upstream end to the downstream end (the exposing stage 55 end). That structure assures that even if the medium 3 fed from the pre-stage path 52 via the paired feed rollers 106 is deviated slightly from the feed path, the medium 3 can be taken in smoothly and securely by the take-in part 173 enlarged on the upstream end without inuring the printing surface 3a before being corrected in the feed direction in passing through the take-in part 173 for correct transfer to the feed path of the exposing stage 55.

The guiding arrangement also has openings 174 formed on the first and second guides 171 and 172 thereof. The openings 174 in the embodiment are formed at positions corresponding to the feed rollers 109, 110, and 111 by cutting parts out of the first and second guides 171 and 172. The feed rollers 109, 110, and 111 are exposed out of the corresponding openings 174 and rotate while pressing the medium 3. Structural description is omitted here for the developing section (paired pressure developing rollers 68) for developing the medium 3 having had exposure process made, the cutting arrangement 72 for cutting the merges of the medium 3, and the bleaching section 77 for bleaching process as described above.

In turn, the following describes the post-heating section 80 arranged for the take-in part by reference to FIGS. 19 through 26.

Figure 19:
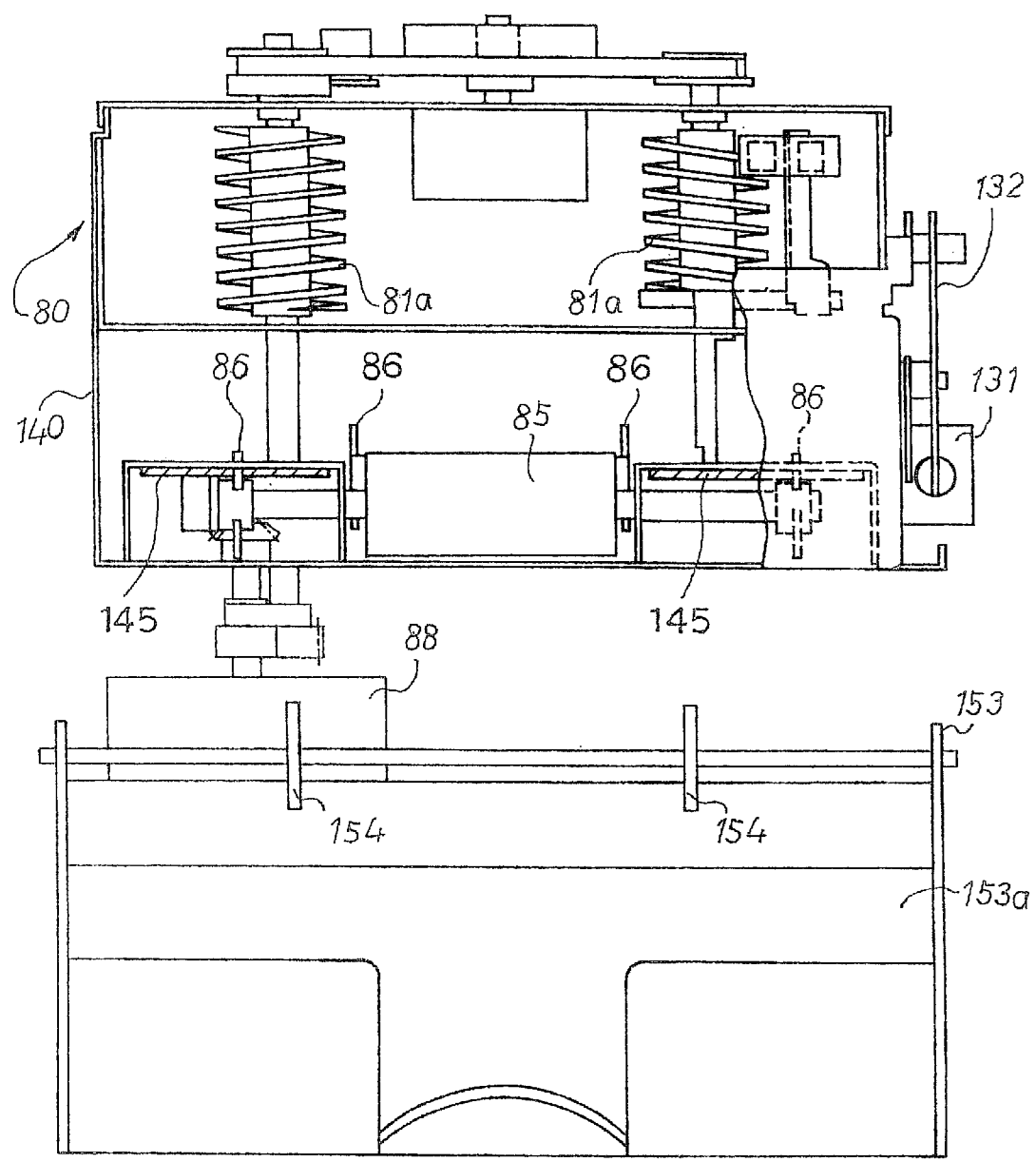
FIG. 19 is an enlarged front view for a take-out section (post-heating section).
Figure 20:
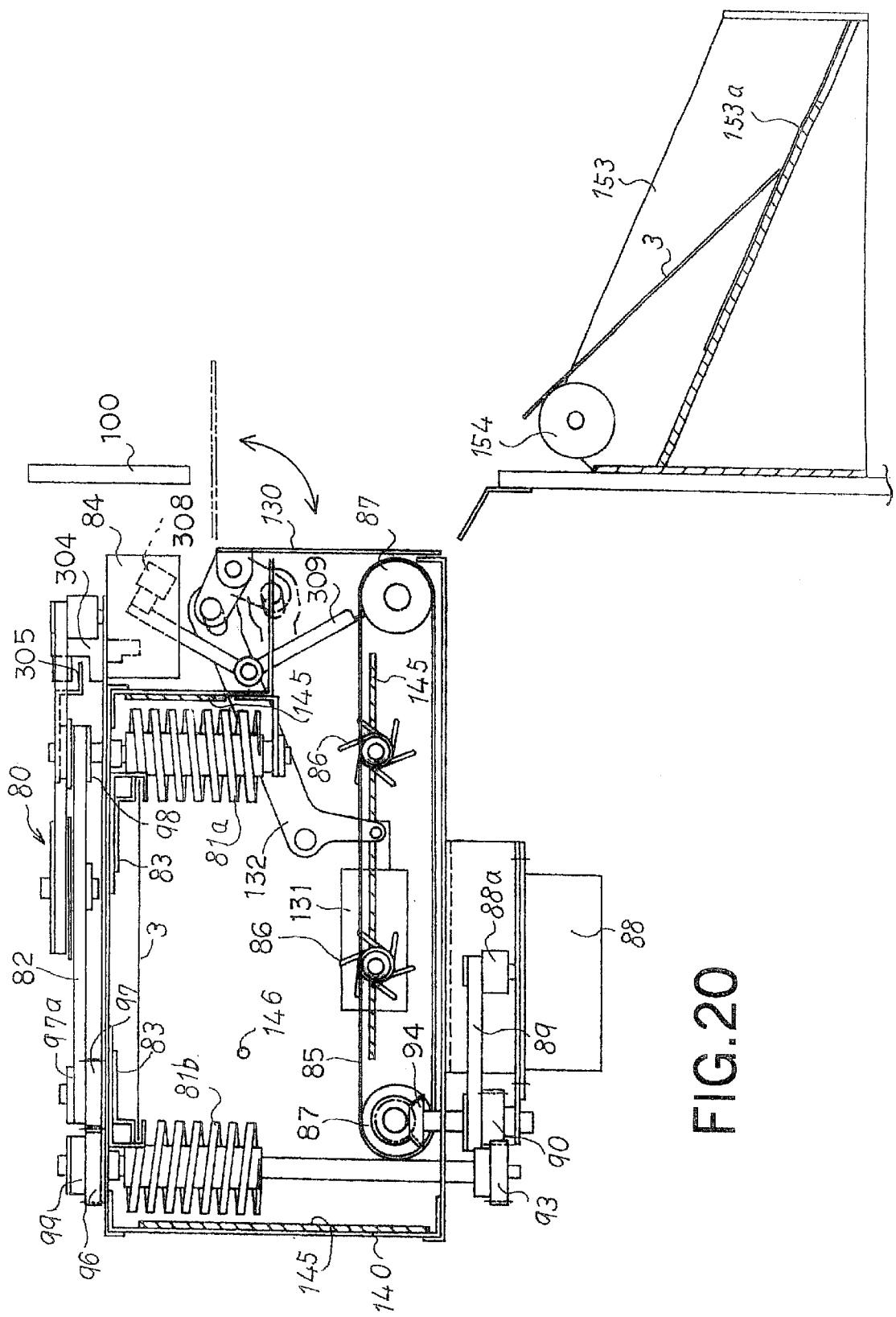
FIG. 20 is a side view for the take-out section (post-heating section) shown in FIG. 19.
Figure 21A:
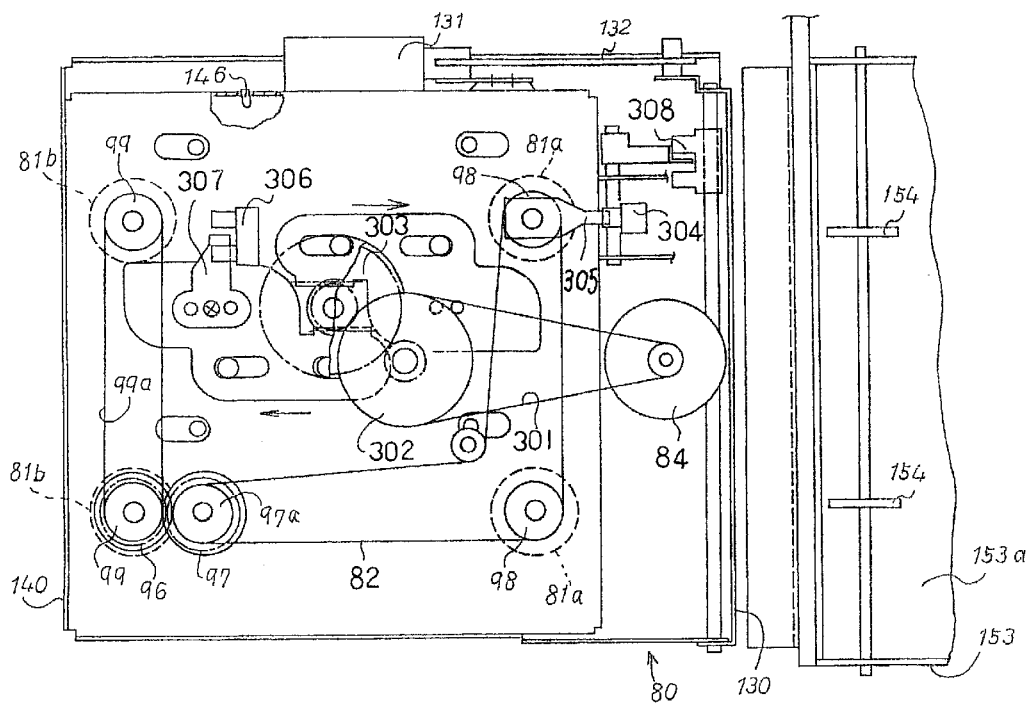
FIG. 21A is a top view for an upper portion of the post-eating section.
Figure 21B:
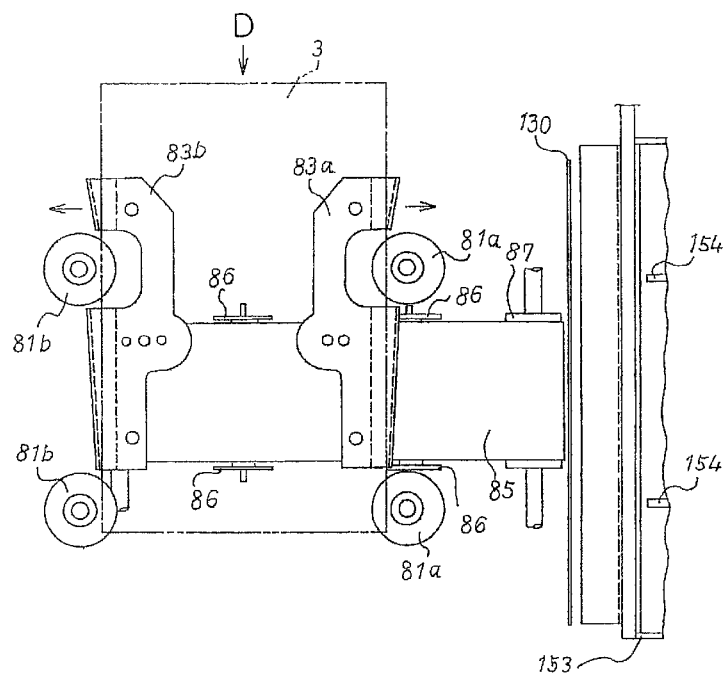
FIG. 21B is a top view for a lower portion of the post-eating section.

FIG. 19 illustrates an enlarged front view for the post-eating section 80, and FIG. 20 is a side view thereof. FIGS. 21A and 21B illustrate top views for the post-heating section 80; FIG. 21A is for an upper portion thereof, and FIG. 21B is for a lower portion thereof.

The post-heating section 80 has four lead screws 81a and 81b (hereinafter referred to as the screws) arranged therein to extend vertically to horizontally place the both sides of the medium 3 fed in to hold the medium 3. The two screws 81a are arranged along the left side in the feed direction of the medium 3, and the two screws 81b are along the right side in the feed direction of the medium 3. Each of the screws has alternative vertical cam crests and roots provided continuously for vertically putting the medium 3 continuously in sequence. The medium 3 can be held at walls of successive crests and roots continuously or at specific intervals, for example, at intervals of one crest by means of paired medium guides 83a and 83b, which are retractable, the medium guide 83a being a guide for the screw 81a and the medium guide 83b for the screw 81b. In place of the screws 81a and 81b having the crests and roots formed successively, alternative means can be used, including helical springs.

Below the four screws 81a and 81b arranged is a flat belt 85 of heat-resistant material extending in a direction traversing the feeding means, for example, the medium 3. The flat belt 85 serves to take the medium 3 out of the printer 1 (front side) if it drops down from the roots of the screws. The flat belt 85 is wrapped on paired drums 87 driven to rotate clockwise in FIG. 20, which does not rotate counterclockwise by a one-way clutch. Each of the paired drums 87 has a crown processed to prevent the flat belt 85 from deviating. The flat belt 85 also has a paddle 86 of heat-resistant material arranged on both sides thereof to contact the medium 3 for help of discharge of the medium 3.

The screws 81a and 81b and the flat belt 85 are driven by a pulse motor 88 and switched over by rotational direction of the pulse motor 88. In detail, the rotation driving force of the pulse motor 88 is transmitted to a pulley gear 90 via an output shaft 88a thereof and a belt 89. The pulley gear 90 is meshed via the one-way clutch with a gear 93 attached on a drive shaft of the screw 81b at the back of the feed direction for transmission of the rotation of the pulse motor 88 in one direction, but not in the other direction. The pulley gear 90 has a bevel gear 94 provided in axis thereof for changing an angle of the shaft rotation by 90 degrees to transmit the rotation to the paired drums 87.

The screw 81b having the gear 93 mounted thereon has a pulley gear 96 attached at a top end thereof for engagement with a pulley gear 97. Each of the two screws 81a has a pulley 98 attached at a top end thereof, and each of the two screws 81b has a pulley 99 attached at a top end thereof.

A belt 99a is tightly stretched around between the pulleys 99 for driving the two screws 81b synchronously, and a belt 82 is tightly stretched around among the two pulleys 98 and the pulley 98a arranged together with the pulley gear 97 for driving the screw 81a synchronously.

The medium guides 83a and 83b are driven by a motor 84 and also moved away not to interfere with the screws 81a and 81b if these are driven. Driving force of the driving motor 84 is transmitted via belt 301 to a large-diameter pulley gear 302. The pulley gear 302 is meshed with a double-reduction year 303 for reducing speed to drive the medium guides 83a and 83b.

A sensor 304 is provided for detecting rotational positions of the screws 81a and 81b. That is, a sensor plate 305 is attached to the screw 81a close to the inlet of the medium to shield the sensor 304 for recognizing the rotational positions of the screws 81a and 81b.

A sensor 306 is provided for detecting positions of the medium guides 83a and 83b. That is, a sensor plate 307 is attached to the medium guide 83a close to the inlet of the medium to shield the sensor 306 for recognizing the positions of the screws 83a and 83b.

Also, a sensor 308 is arranged to detect whether the medium 3 comes at the discharge port or is discharged completely. That is, the medium 3, when it is fed to the discharge port by the flat belt 85, pushes the sensor plate 309 up to shield the sensor 308 for detection of the discharge state.

On the front side of the printer 1 arranged is a switchable discharge door 130 that can be opened only when the medium 3 is discharged. That is, the discharge door 130 is opened by a link 132 for converting and magnifying linear motion of a solenoid 131 to rotation motion when the solenoid 131 is energized for attraction along with discharge of the medium 3. The discharge door 130 is kept close by its own weight unless the medium 3 is discharged, thereby preventing the internal temperature from dropping down.

Further, the post-heating section 80 has a container 140 disposed at a highest position therein and positioned close to the light source 60a serving also as a heat source for the exposing section, thereby making a thermal efficiency of the printer 1 high.

The whole post-heating section 80 is covered by a container 140 having a heat insulating material stuck to an outside wall thereof to keep the temperature to a specific value. The container 140 also has a heater 145 disposed to both sides of the screws 81a and 81b and below a center thereof respectively. The heaters 145 are turned on or off by a temperature sensor 146 for detecting a temperature inside the container 140 to keep the temperature to a specific value.

The printer 1 has a discharge tray 153 having a piling portion 153a disposed on the front side thereof for discharging and stacking the finished (printed) medium 3 in succession by guide members 154 (for example, coils).

In turn, the following describes operation of the post-heating section 80 explained above in construction.

The motors 88 and 84 are started with power turned and stopped with initial positions of the screws 81a and 81b, the guides 83a and 83b detected. The inside of the container 140 is increased to the specific temperature by the heater 145.

The medium 3, if fed in, is guided to put on highest leads (roots) of the screws 81a and 81b as the medium guides 83a and 83b are driven. With the driving motor 84 started to rotate, the rotation is transmitted to the pulley gear 302 via the belt 301 and speed-reduced via the double-stage gear 303. The medium guides 83a and 83b have respective lacks formed thereon for meshing with a pinion of the double-stage gear 303. When the pinion rotates, the medium guides 83a and 83b are driven to move linearly to come far and near to each other. The guide 83b, as described above, has the sensor plate 307 attached thereto, and its position is detected as the sensor plate 307 shields the sensor 306 for control of the driving.

When the medium 3 is put on the highest lead, the driving motor 84 rotates to drive the medium guides 83a and 83b for retracting to positions not to prevent the medium 3 from moving down.

The motor 88 shown in FIG. 20 then is started to rotate counterclockwise. Rotation of the pulse motor 88 is transmitted to the pulley gear 90 via the belt 89, but not to the flat belt 85 as the paired drums 87 has the one-way clutch provided therein as described above. On the other hand, rotation of the pulley gear 90 is transmitted to the gear 93 to synchronously rotate the two screws 81b clockwise via the belt 99a. The rotation also is transmitted to the screw 81a via the pulley gears 96 and 97 and the belt 82 to synchronously rotate the two screws 81a counterclockwise via the belt 82.

After the medium 3 is put on the highest lead, as described above, the screws 81a and 81b are driven to move down the medium 3 by one or more leads. The screw 81a, as described above, has the sensor plate 305 attached on the front side thereof in the medium feed direction, and the sensor plate 305 shields the sensor 304 to detect a position of the screw for control of driving the rotation (dropping the medium) and stopping.

Then, the screws 81a and 81b are moved to the medium bringing position again for bringing the next medium in to put on the next leads. As the medium 3 fed in successively are put on and moved down repeatedly, the medium can be dropped down on the flat belt 85 successively.

When the pulse motor 88 is started to rotate clockwise in that state, the paired drums 87 shown in FIG. 20 are driven to rotate clockwise via the belt 89, the pulley gear 90, and the bevel gear 94, but the screws cannot be driven by the one-way clutch of the gear 93. The flat belt 85 then is driven in the discharge direction to transfer the medium 3 dropped thereon in the discharge direction. The paddle 86 is rotated by friction with the flat belt 85 to assist for feeding the medium 3.

When the medium 3 on the flat belt 85 is fed to the discharge port, the sensor plate 309 is moved and detected by the sensor 308. The detection signal prompts the solenoid 131 to open the discharge door 130 for discharge of the medium 3. The medium 3 discharged out of the printer 1 is passed through a roller 154 before being stuck on the piling portion 153a of the discharge tray 153. At the same time, the sensor 308 detects passing of the medium 3 through the discharge door 130 to stop the solenoid 131 from driving, allowing the discharge door 130 to close by its own weight.

The post-heating section 80 structured as described above provides the following effects.

As the media 3 are made to stay and post-heated in the container 140, no post-heating process is needed on the feed path as in the prior arts. As a result, the feed path can be made shorter to make the whole printer compact. Also, as making the media 3 stay in, the container 140 can be controlled in the temperature and staying time to set the post-heating conditions to optimum ones for the medium 3. Further, as the container 140 is structured to contain the medium 3 on a number of stages so that the container 140 can have the medium 3 entered and contained successively for hot-heating process, the medium 3 can be processed successively at a high speed for increased productivity. Further more, as the leads of the screws 81a and 81b can be separated therebetween to a distance not to allow the medium 3 contacts each other, the post-heating section 80 can be effectively compact.

Further more, as the screws 81a and 81b are provided to rotate in the same direction as the medium feed direction, the medium 3 can be securely fed in the container 140. Further more, as the flat belt 85 having the medium 3 dropped thereon has the paddles 86 arranged therein, the medium 3 can be smoothly discharged even if the medium 3 curls upward or downward. In addition, the roller 154 arranged on the upstream side of the discharge tray 153 allows the medium 3 to form well on the piling portion 153a.

Figure 25:
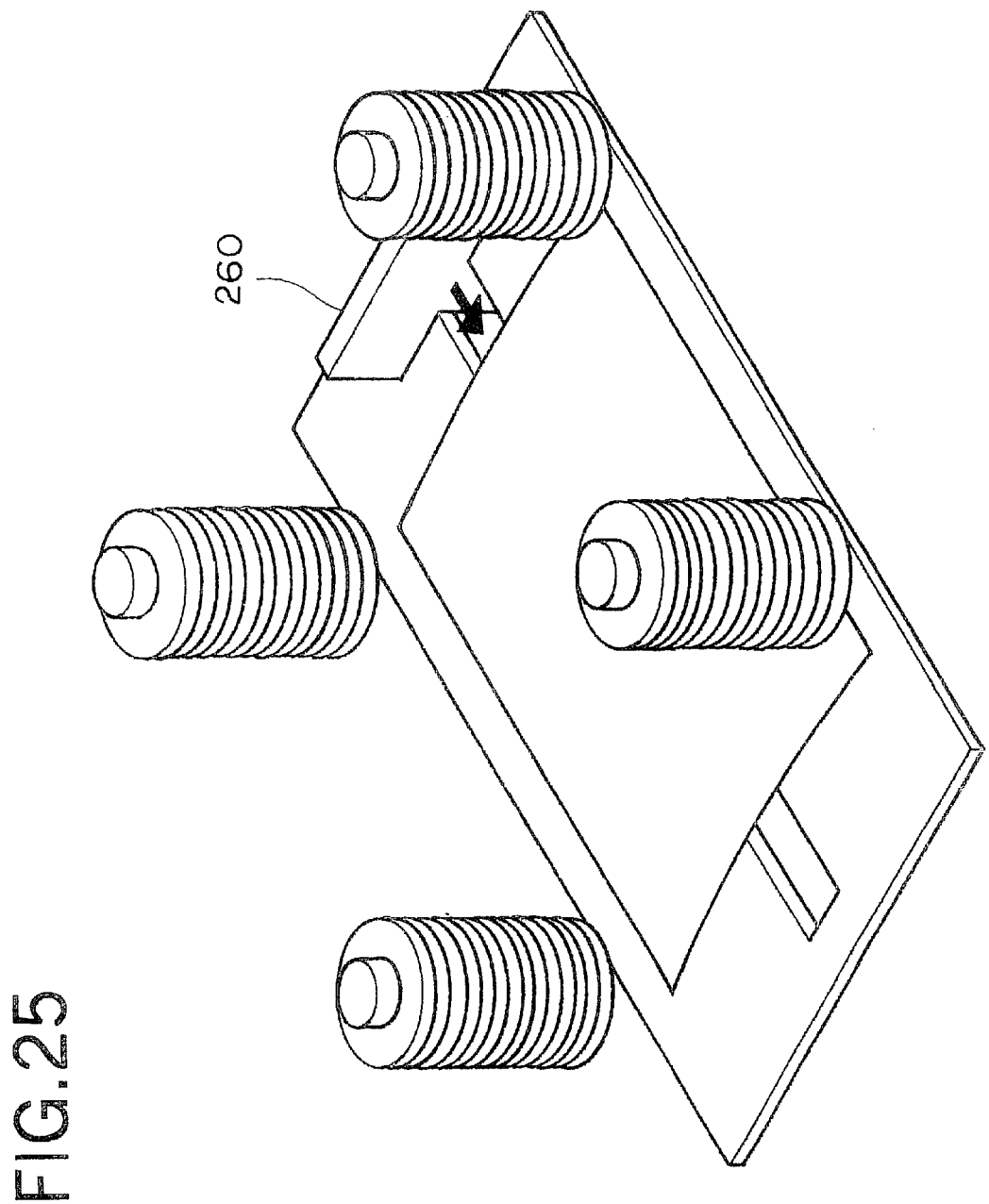
FIG. 25 is a view for a variation of means for discharging the medium from the post-heating section (staying means).
Figure 26:
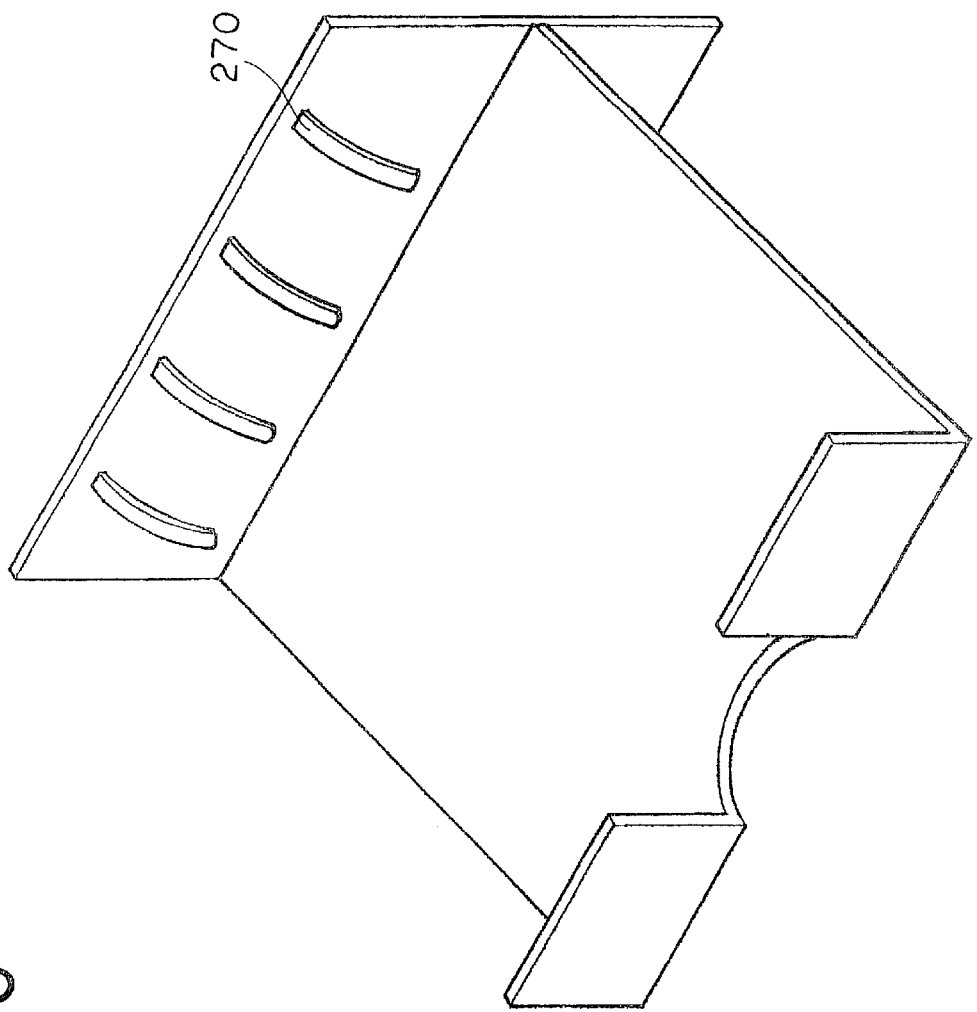
FIG. 26 is a view for a variation of means for making the medium slide into the discharge tray.

In the embodiment described above, the medium 3 dropping from the screws 81a and 81b is discharged out of the apparatus via the flat belt 85. Instead, an inclined slide may be arranged toward an outside of the apparatus to make the dropping medium 3 slide down for removal. Alternatively, as shown in FIG. 25, a reciprocating extruding arrangement 260 is provided and is driven to feed the medium 3 outward from the apparatus whenever the medium 3 drops down. In place of the roller 154 for guiding the medium 3 to the discharge tray, as shown in FIG. 26, curved guiding members 270 may be arranged at specific intervals.

Figure 22:
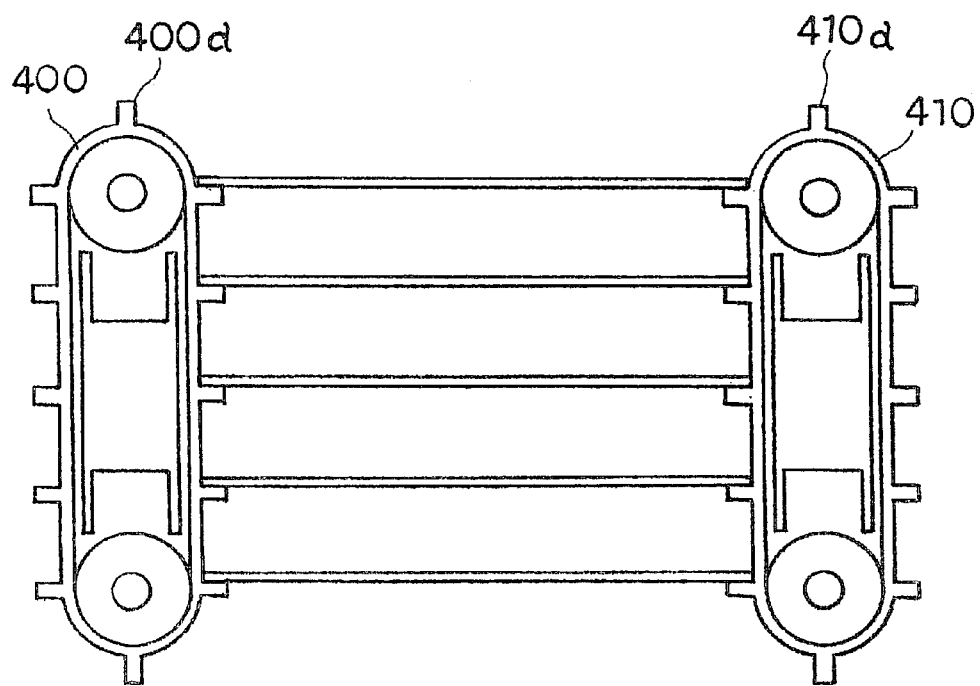
FIG. 22 is a view for a first variation of the post-heating section (staying means).
Figure 23:
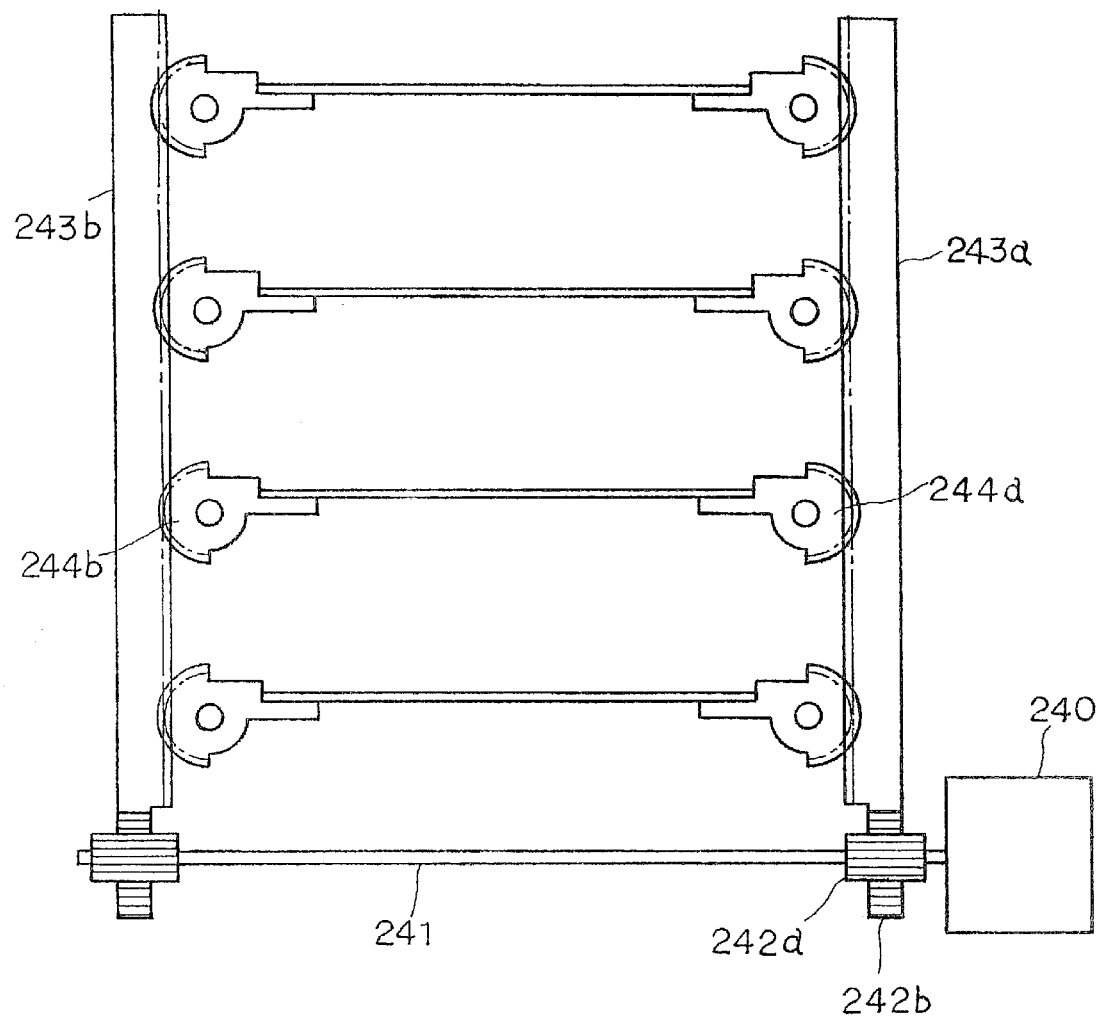
FIG. 23 is a view for a second variation of the post-heating section (staying means).
Figure 24:
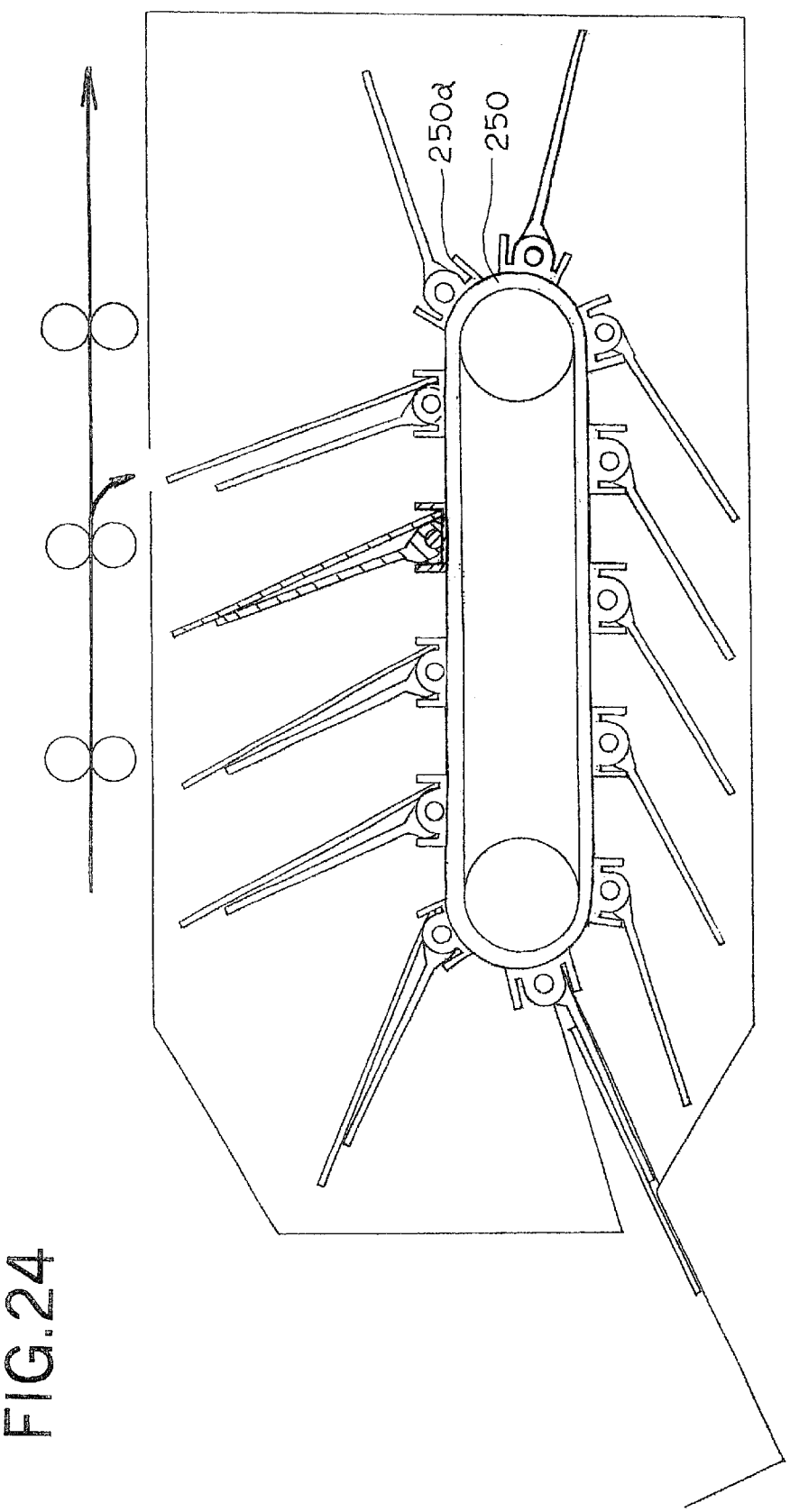
FIG. 24 is a view for a third variation of the post-heating section (staying means).

For making the medium 3 to be post-heated stay, the successive vertical staying means can be properly changed to various forms such as a vertical staying along a circle. As an alternative example, as shown in FIG. 22, it may be preferable that a driving belt 400 rotated clockwise and a driving belt 410 rotated counterclockwise are arranged to face each other and that the belts 400 and 410 having projections 400a and 410a are formed at specific intervals respectively for putting the medium 3 on the projections. As another alternative example, as shown in FIG. 23, it may be preferable that a motor 240 drives a shaft 241, the shaft 241 synchronously transmits the driving force to pinion gears 242a and 242b to move up and down, and the vertical motions make the semilunar gears 244a and 244b move in response thereto. Leading end projections on the semilunar gears 244a and 244b can catch and release down the medium 3 put thereon for shifting the medium 3 downward in succession. As still another alternative example, as shown in FIG. 24, it may be preferable that a driving belt 250 is arranged along the feed path for the medium 3 and has medium receptacles 250a at specific intervals for branching the medium 3 from the feed path to continuously feed the medium 3 into the medium receptacles 250a. As still another alternative example, as shown in FIG. 25, it may be preferable that an extruding arrangement 260 is provided to extrude the medium 3 in an arrow direction in the figure.

The following describes operation of the Cycolor printer configured as described above briefly.

When printing is started in the state that the medium cassette 5 is loaded in the cassette room 2, the medium 3 fed from the medium cassette 5 by pick roller 101 are fed out one by one to the feed path 51 by the medium separating arrangement, including the feed roller 102 and the separating roller 103, before being fed from the pre-stage path 52 to the exposing stage 55. The exposing stage 55 stops the medium 3 once. The exposing projector 60 irradiates light onto the printing surface 3a of the medium 3 on the basis of a desired image pattern, thereby making the exposure process as a preprocess for forming the desired image.

After the exposure process ends, the exposed medium 3 is transferred to the post-stage path 57 and specifically cleaned by the paired cleaning rollers 115 before being fed through the feed path 62 to the switchback section 64.

The switchback section 64 allows the exposed medium 3 to stay for a time (dark time) enough to fully develop its colors. It should be noticed that the successive medium 3 fed after are made to stay on the feed paths 57 and 62 between the exposing stage 55 and the switchback section 64. After that, the preceding medium 3 is fed back on the same feed path 62 at a specific timing as the paired feed rollers 117 and 118 are controlled to rotate inversely.

The medium 3 fed back on the feed path 62 is fed to the alternative path 121 via the switching gate 120, is guided to the paired pressure developing rollers 68, and has surface load applied to the both sides thereof, thereby forming (color-developing) the desired image.

The medium 3 having the development process completed is continued to feed along parts of the surface on one of the paired pressure developing rollers 68 to transfer from the alternative path 121 to the high-speed feed path 124, is checked for paper jamming in the course of feed by the paper jam detecting sensor 127, and is fed to the cutting arrangement 72.

The medium 3 having the four side edges cut out by the cutting arrangement 72 is bleaching-processed (ink-fixing-processed) during passing the bleaching section 77, is fed to the take-out part (post-heating section 80) on the top left side of the apparatus housing 100 for post-heating process as desired, and is discharged to the discharge tray 153. It should be noticed that the medium detecting sensor 129 arranged in front of the upstream side of the post-heating section 80 controls the feed timing for the medium 3.

As described above in detail, the printer 1 in the embodiment having an apparatus housing and making a plurality of processes on a recording medium, comprises in combination: a first processing section for making a first process on said recording medium; a second processing section arranged close to said first processing section for making a second process on said recording medium having had the first process made by said first processing section, thereby capable of obtaining an image on a surface of the recording medium, the second process being different from the first process by said first processing section; and, a recording medium feed path formed between said first processing section and the second processing section; wherein the recording medium feed path is arranged to form virtual traversing. The entire apparatus therefore can be made compact without decreasing recording medium feeding and printing capabilities.

Alternatively, making the entire apparatus compact can be achieved by a structure that said recording medium feed path extending from said containing section to said take-out section for taking out the recording medium having printing process finished is formed along inside surfaces of said apparatus housing.

Also, with the structure that the recording medium feed path has the switchback path in parts thereof for substantially extending the feed path, the entire structure can be minimized and at the same time, the recording medium feed path can be maximized. Further, the printing processes can be completed in short time while meeting the required printing accuracy without using large-scale arrangements.

With the structure of the printer 1 in the embodiment described above, it is possible to obtain a printer of low price by way of suppressing apparatus manufacturing costs with use of simple feed driving arrangements and controls.

With the above-mentioned recording medium containing section and take-out section structured to arrange close to each other, the operationability and maintainability of the apparatus can be increased.

Further, with the printer 1 in the embodiment, the heat generating light source (exposing projector 60 and light source 60a) and the take-out section (post-heating section 80) for heating the recording medium (medium 3) are concentrated together on the upper portion of the apparatus housing 100. This can increase the heat radiation efficiency. Further more, the light leaked from the light source can be used for the bleaching process, thus requiring no additional light source and space for the bleaching. As a result, reducing the cost of the printer 1 and minimizing the apparatus housing 100 can be achieved at the same time.

Further, with the printer 1 in the embodiment, the rotation speeds of the number of rollers disposed along the feed path can be controlled independently. This makes releasing from possible jamming easy.

Further more, with the printer 1 in the embodiment, on the upper portion of the apparatus housing 100 arranged is the containing section 75 for collecting the four side edges cut of the medium 3 by the cutting arrangement 72. This can increase maintainability in discarding the dust.

Further more, with the printer 1 in the embodiment, a multiple of the media 3 can be contained in the medium cassette 5 as fed out linearly toward the feed path without changing the direction from the medium cassette 5. The feed path can be made linear. As a result, the apparatus structure can be simplified, thereby achieving decrease of the manufacturing cost and minimization of the apparatus housing 100.

The embodiment of the present invention has been described in detail with the example of Cycolor type printer suitable for the Cycolor film as a photosensitive recording sheet. The present invention can also be embodied for printers of other different types.

What is claimed is:

1. A printer for a recording medium, comprising:

a housing, a containing section for retaining recording media situated in the housing, a take-out section situated adjacent to the containing section for taking out the recording media after processing, a feed path extending from the containing section to the take-out section for processing the recording media, an exposing section situated in about a center of the housing adjacent to the containing section for exposing light on the recording media one by one, said exposing section having an exposing light source situated at an upper portion of the housing, an exposing stage situated at a lower portion of the housing and arranged on the feed path at an exposure position where light exposure is made one by one, and an exposing system situated between the exposing light source and the exposing stage, and a developing section situated at the lower portion of the housing adjacent to the exposing section and arranged on the feed path for developing an image by pressing a recording medium exposed by light at the exposing section, wherein said containing section and take-out section are situated at one side of the housing and said developing section is situated at the other side of the housing; a part of the feed path from the containing section to the exposing section is bent, and a part of the feed path from the developing section to the take-out section is bent to be located at a diagonal position of the housing relative to the feed path from the containing section to the exposing section so that the feed path extending from the containing section to the take-out section surrounds the exposing section around an inner periphery of the housing; a part of the feed path extending from the exposing section to the developing section is bent substantially perpendicularly and is formed with an additional path extending upwardly to thereby prolong the feed path.

2. The printer according to claim 1, wherein said feed path situated between the exposing section and the developing section has a staying section for additionally staying said recording medium therein.

3. The printer according to claim 1, wherein said has additional path to prolong the feed path is a switchback path to change a moving direction of the recording medium from the exposing section to the developing section.

4. The printer according to claim 1, wherein said developing section has paired rollers for pressing said recording media at a specific pressure and said feed path is formed so that a recording medium having had a pressure development process made along said paired rollers is fed to a downstream side.

5. The printer according to claim 1, wherein said exposing stage has stretching means for stretching said recording medium.

6. The printer according to claim 5, wherein said stretching means has paired feed rollers made to rotate while pressing against two sides of said recording medium to apply a specific feeding force to said recording medium and at least one of said paired feed rollers is made to act on said recording medium while said feeding force opens at a specific angle with respect to a feed direction of said recording medium.

7. The printer according to claim 1, further comprising a fixing section for fixing the image formed on a surface of said recording medium having the image developed thereon by said developing section, said fixing section being provided above said exposing section.

8. The printer according to claim 7, wherein said fixing section re-irradiates a light from said exposing light source to a surface of said recording medium having the image formed thereon to fix the image thereon.

9. The printer according to claim 1, wherein said containing section has a cassette therein having a package with said recording media contained therein and a light shielding member for shielding said recording media contained in said package against external lights.

10. The printer according to claim 9, wherein said package has a humidity conditioning agent provided therein, said humidity conditioning agent being replaceable.

11. The printer according to claim 9, wherein said cassette has identifying means for identifying said recording media contained in said package provided therein.

12. The printer according to claim 9, wherein said containing section further has a lid allowing said cassette to load from an outside and a shutter switching arrangement for opening and closing a shutter provided on said cassette, said shutter switching arrangement being made up of a link member for linking between said lid and said cassette so as to open said shutter after closing of said lid.

13. The printer according to claim 1, wherein said take-out section is arranged at a top portion of said housing and has a post-heating section provided therein for post-heat-processing said recording made medium with the image thereon.

14. The printer according to claim 13, wherein said post-heating section has heaters for heating said recording medium and staying means for making a plurality of said recording media stay therein.

15. The printer according to claim 14, wherein said staying means for making said recording media stay in succession while moving said recording media in a vertical direction.

16. The printer according to claim 15, wherein said staying means has at least four screws for supporting said recording media horizontally, each of said screws having a recording media placing portion continuing vertically for successively moving said recording media placed on said recording media placing portion vertically with said screws driven to rotate.

17. The printer according to claim 16, wherein below said staying means, feeding means for feeding outward said recording media dropping from said recording media placing portion is arranged.

* * * * *